(12) United States Patent
Takigawa et al.

(10) Patent No.: US 11,245,241 B2
(45) Date of Patent: Feb. 8, 2022

(54) OPTICAL FIBER FOR A FIBER LASER, FIBER LASER, AND PRODUCTION METHOD FOR OPTICAL FIBER FOR A FIBER LASER

(71) Applicant: FANUC CORPORATION, Yamanashi (JP)

(72) Inventors: Hiroshi Takigawa, Yamanashi (JP); Tetsuhisa Takazane, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 43 days.

(21) Appl. No.: 16/594,852

(22) Filed: Oct. 7, 2019

(65) Prior Publication Data

US 2020/0136337 A1 Apr. 30, 2020

(30) Foreign Application Priority Data

Oct. 30, 2018 (JP) .............................. JP2018-204158

(51) Int. Cl.
*H01S 3/067* (2006.01)
*H01S 3/04* (2006.01)
(Continued)

(52) U.S. Cl.
CPC ........ *H01S 3/06733* (2013.01); *H01S 3/0405* (2013.01); *H01S 3/0675* (2013.01); *H01S 3/06716* (2013.01); *H01S 3/1691* (2013.01); *H01S 3/06729* (2013.01); *H01S 3/09415* (2013.01); *H01S 3/094007* (2013.01);
(Continued)

(58) Field of Classification Search
None
See application file for complete search history.

(56) References Cited

U.S. PATENT DOCUMENTS 5,303,318 A * 4/1994 Tateda .............. C03B 37/01446
385/123
10,069,271 B2 * 9/2018 Kliner ................... H01S 3/0675
(Continued)

FOREIGN PATENT DOCUMENTS

JP   H05-249328 A   9/1993
JP   H09-159846 A   6/1997
(Continued)

OTHER PUBLICATIONS

An Office Action; "Notice of Reasons for Refusal," mailed by the Japanese Patent Office dated Aug. 18, 2020, which corresponds to Japanese Patent Application No. 2018-204158 and is related to U.S. Appl. No. 16/594,852; with English language translation.

*Primary Examiner* — Tod T Van Roy
(74) *Attorney, Agent, or Firm* — Studebaker & Brackett PC

(57) ABSTRACT

An optical fiber for a fiber laser includes a core to which a rare-earth element is added, a first cladding formed around the core; and a second cladding formed around the first cladding, and excitation light is guided from at least one end of the first cladding to excite the rare-earth element to output a laser oscillation light. An addition concentration of the rare-earth element to the core is different in a longitudinal direction of the optical fiber for a fiber laser, and a core diameter and a numerical aperture of the optical fiber for a fiber laser are constant in the longitudinal direction of the optical fiber for a fiber laser.

9 Claims, 29 Drawing Sheets

(51) Int. Cl.
*H01S 3/16* (2006.01)
*H01S 3/094* (2006.01)
*H01S 3/0941* (2006.01)
*H01S 3/23* (2006.01)

(52) U.S. Cl.
CPC ........... *H01S 3/1603* (2013.01); *H01S 3/1618* (2013.01); *H01S 3/1695* (2013.01); *H01S 3/2383* (2013.01); *H01S 2301/03* (2013.01)

(56) References Cited

U.S. PATENT DOCUMENTS

| | | | | |
|---|---|---|---|---|
| 2007/0053400 | A1* | 3/2007 | Sinha | H01S 3/06716 372/64 |
| 2009/0080472 | A1* | 3/2009 | Yao | H01S 3/06716 372/6 |
| 2012/0069858 | A1 | 3/2012 | Gray et al. | |
| 2014/0212102 | A1* | 7/2014 | Hoover | G02B 6/024 385/126 |
| 2014/0286362 | A1* | 9/2014 | Gapontsev | H01S 3/06754 372/6 |

FOREIGN PATENT DOCUMENTS

| | | |
|---|---|---|
| JP | 2001-274489 A | 10/2001 |
| JP | 2008-308361 A | 12/2008 |
| JP | 2009-032910 A | 2/2009 |
| JP | 2009-129989 A | 6/2009 |
| JP | 2010-103223 A | 5/2010 |
| JP | 2010-226107 A | 10/2010 |
| JP | 2012-133388 A | 7/2012 |
| JP | 2014-143319 A | 8/2014 |
| JP | 2014-528885 A | 10/2014 |
| JP | 2017-009967 A | 1/2017 |
| WO | 2007/049705 A1 | 5/2007 |

* cited by examiner (S101)

(S102)

(S103)

(S303)

(S403)

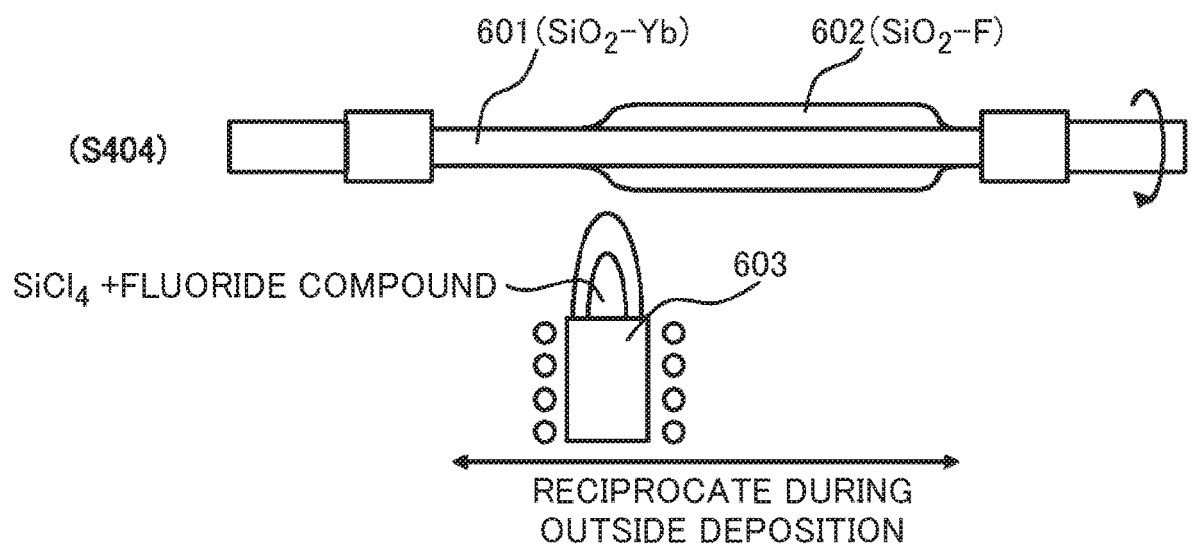
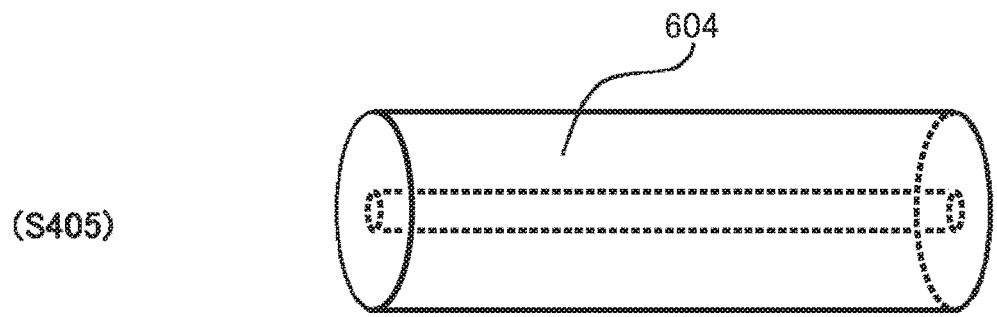

OPTICAL FIBER FOR A FIBER LASER, FIBER LASER, AND PRODUCTION METHOD FOR OPTICAL FIBER FOR A FIBER LASER

This application is based on and claims the benefit of priority from Japanese Patent Application No. 2018-204158, filed on 30 Oct. 2018, the content of which is incorporated herein by reference.

BACKGROUND OF THE INVENTION

Field of the Invention

The present invention relates to an optical fiber for a fiber laser, a fiber laser, and a production method for the optical fiber for a fiber laser. Specifically, the present invention relates to an optical fiber for a fiber laser which forms a resonator in a fiber laser and in which signal light propagating through a core is amplified by excitation light and a production method therefor. Moreover, the present invention relates to a fiber laser which uses the optical fiber for a fiber laser.

Related Art

In a high-power fiber laser, a double-clad fiber structure having a three-layer structure including a core, a first cladding, and a second cladding is generally used as an amplification optical fiber. In a double-clad fiber structure, excitation light is guided to a first cladding called an excitation cladding for guiding the excitation light. The excitation light guided to the first cladding is gradually absorbed in a core having a higher refractive index than the first cladding while propagating through the first cladding. In order to confine excitation light in the first cladding, a low-refractive index polymer is frequently used in a second cladding having a lower refractive index than the first cladding. However, an air-hole-type cladding formed of quartz having excellent heat resistance similarly to the core and the first cladding is sometimes used as the second cladding.

$Yb^{3+}$ is dominantly used as rare-earth ions added to the core. This is because $Yb^{3+}$ has quantum efficiency of substantially 1, and is a quasi-three-level system, so that quantum defect is small and the amount of heat generation per unit laser output is suppressed to be the smallest among rare-earth ions. Since a high-intensity signal light confined in the core has a large gain/loss ratio, the signal light realizes completely saturated amplification and enables operations with maximum efficiency. In the present specification, a term "optical fiber for a fiber laser" is used to mean an amplification optical fiber having the double-clad fiber structure unless particularly stated otherwise.

In recent years, there is a demand to further increase the output of a fiber laser. However, when the entire length of an optical fiber for a fiber laser is increased so that excitation light is sufficiently absorbed in the core, non-linear stimulated scattering such as stimulated Raman scattering (SRS) occurs. When non-linear stimulated scattering occurs, Stokes light increases to saturate laser output and restrict a high-power operation. On the other hand, when an effective absorption coefficient is increased to shorten an entire length of an optical fiber for a fiber laser by adding a high concentration of Yb ions or decreasing an aspect ratio (=(cladding diameter)/(core diameter)), occurrence of non-linear stimulated scattering such as SRS is suppressed. However, since a thermal load per unit length increases, an operation limit is reached due to the increase in temperature.

An actual thermal load per unit length is not uniform in the longitudinal direction of an optical fiber for a fiber laser. In the vicinity of an excitation light introduction end, since a large amount of excitation light is absorbed in the core, a thermal load is large, and an actual operation limit due to the increase in temperature is restricted by the increase in temperature in the vicinity of the excitation light introduction end. Therefore, it is necessary to maintain the temperature in the longitudinal direction of the optical fiber for a fiber laser to be uniform as much as possible. Moreover, it is necessary to cool the optical fiber for a fiber laser efficiently and uniformly.

As described above, in the conventional fiber laser, since the increase in temperature of an optical fiber for a fiber laser (particularly, the increase in temperature in the vicinity of the excitation light introduction end of the optical fiber for a fiber laser) is high due to the increase in the output power, there is a problem that a coating layer or the like of the optical fiber for a fiber laser is likely to burn, and the output of the fiber laser is restricted by this thermal limit. Therefore, a number of methods have been tried to solve this problem.

Patent Document 1 discloses an optical fiber for a fiber laser including a rare-earth-added core to which a rare-earth element is added and a cladding formed around the rare-earth-added core, in which excitation light is guided from an end of the cladding to excite the rare-earth element to output a high-power laser oscillation light, wherein the rare-earth-added core is divided into a plurality of core regions in the longitudinal direction, and addition concentrations of the rare-earth element added to the respective core regions are different. Patent Document 1 also discloses an optical fiber for a fiber laser obtained by combining a plurality of Yb-added cores having any one of addition concentrations of 500 ppm, 700 ppm, and 1100 ppm as a specific addition concentration. According to Patent Document 1, a core region located closer to the excitation light introduction end has a lower addition concentration so that the amount of excitation light absorbed in the core in the vicinity of the excitation light introduction end is decreased to suppress the increase in temperature in the vicinity of the excitation light introduction end. Moreover, Patent Document 1 also discloses a production method for the optical fiber for a fiber laser, including manufacturing a plurality of divided fibers having rare-earth-added cores having different addition concentrations and splicing the terminals of the respective divided fibers.

However, in the optical fiber for a fiber laser, if the addition concentrations of rare-earth elements added to the respective core regions are different, the refractive index of the core changes. For example, when a Yb addition concentration is increased from 500 ppm to 1100 ppm, the refractive index of the core is increased by approximately 0.00044 and the numerical aperture (NA) is increased by up to approximately 1.5 times. Although the increasing rate in the numerical aperture (NA) can be reduced by adding an element such as Ge that increases the refractive index other than Yb to the core, the numerical aperture may increase by approximately several %. With regard to the change in numerical aperture (NA), no problem may occur if signal light propagating through a core while reciprocating between a high reflector-fiber Bragg grating (HRFBG) and an output coupler-fiber Bragg grating (OCFBG) that form a cavity propagates from an optical fiber having a small numerical aperture (NA) to an optical fiber having a large numerical aperture. However, in contrast, when signal light propagates from an optical fiber having a large numerical aperture (NA) to an optical fiber having a small numerical aperture, confinement of signal light to the core weakens gradually. An optical fiber for a fiber laser has a length of several tens of meters and is disposed in a state of being wound in a circular form. Therefore, if the confinement of signal light to the core of an optical fiber for a fiber laser weakens gradually, there is a problem that a bending loss of the optical fiber for a fiber laser increases and the excited signal light is likely to leak from the core.

Patent Document 1 discloses a specific production method for the optical fiber for a fiber laser, including cutting optical fibers having different Yb concentrations into a desired length, removing a UV-curable resin at the terminals of the cut optical fibers, splicing the terminals by fusion using a fusion splicer, and recoating the splice from which a UV-curable resin is removed with a UV-curable resin. However, since the splicing has some connection loss, there is a risk that high-intensity signal light leaking from the core may generate heat and the recoated UV-curable resin having low heat resistance may burn. Therefore, there is another problem that the optical fiber for a fiber laser produced by this production method has a reliability issue.

Patent Document 2 discloses an optical fiber for a fiber laser including a rare-earth-added core to which a rare-earth element is added and a cladding formed around the rare-earth-added core, in which excitation light is guided from an end of the cladding to excite the rare-earth element to output a high-power laser oscillation light, wherein an outer diameter ratio between the rare-earth-added core and the cladding is different in the longitudinal direction. Specifically, Patent Document 2 also discloses an optical fiber for a fiber laser in which the outer diameter of the cladding is the same and the outer diameter of the rare-earth-added core increases gradually in the longitudinal direction, and an optical fiber for a fiber laser in which the outer diameter of the rare-earth-added core is symmetrical about the center in the longitudinal direction and changes in the range of 50 μm and 80 μm in the longitudinal direction. According to Patent Document 2, since an absorption loss of the optical fiber for a fiber laser decreases as the core diameter decreases, it is possible to control the absorption characteristic of excitation light in the longitudinal direction of the optical fiber for a fiber laser easily with this optical fiber for a fiber laser and to planarize the temperature distribution in the longitudinal direction of the optical fiber for a fiber laser.

Patent Document 2 discloses a production method for the optical fiber for a fiber laser, including manufacturing a preform having a portion serving as the rare-earth-added core, cutting the circumference of the preform in a tapered form so that the outer diameter ratio between the rare-earth-added core and the cladding is different in the longitudinal direction, and subjecting the cut preform to wire drawing so that the outer diameter of the cladding is constant.

The biggest problem of the optical fiber for a fiber laser disclosed in Patent Document 2 is the production method therefor. Cutting the circumference of the preform in a tapered form so that the outer diameter ratio between the rare-earth-added core and the cladding is different in the longitudinal direction, and subjecting the cut preform to wire drawing so that the outer diameter of the cladding is constant means that one preform has only one portion in which the outer diameter ratio between the core and the cladding changes within a desired range, and an optical fiber for a fiber laser for one fiber laser can be produced from one preform. Some extent of increase in cost of an optical fiber for a fiber laser is allowable as compared to communication optical fibers used for long-distance communication. However, if an optical fiber for a fiber laser for one fiber laser can be produced from one preform, there is a problem that the cost may increase remarkably and such an optical fiber for a fiber laser is not suitable for practical use. Moreover, in a performance perspective, no problem may occur when signal light propagating through the core while reciprocating between HRFBG and OCFBG that form a cavity propagates from an optical fiber having a small core diameter to an optical fiber having a large core diameter. However, in contrast, when the signal light propagates from an optical fiber having a large core diameter to an optical fiber having a small core diameter, there is a problem that the excited signal light is likely to leak from the core similarly to the technology disclosed in Patent Document 1.

Patent Document 3 discloses an optical fiber for a fiber laser including a core to which a rare-earth element serving as a gain medium is added and a cladding formed around the core in which a virtual temperature of the core is 1500° C. or lower and the virtual temperature of the core is different in the longitudinal direction. Moreover, Patent Document 3 discloses a production method for the optical fiber for a fiber laser, including performing annealing after heating and melting an optical fiber base material so that a virtual temperature of a core formed from the core material is 1500° C. or lower and radiating a $CO_2$ laser beam after the annealing to subjecting the optical fiber base material to wire drawing while changing the virtual temperature of the core in the longitudinal direction.

In the technology disclosed in Patent Document 3, even when the virtual temperature of the core is changed from 1000° C. to 1500° C. which are specifically described in the specification, the light absorption coefficient is changed by approximately 1.25 times at a wavelength of 915 nm and approximately 1.4 times at a wavelength of 970 nm to 980 nm when read from the diagrams disclosed in Patent Document 3, and there is a problem that the control range of light absorption coefficient is narrow. As will be described later, it is preferable that the light absorption coefficient is changed by approximately 4 times. Moreover, if the virtual temperature is changed in the temperature range, since the refractive index is changed by approximately 1.4635 to 1.4646 as read from the diagrams disclosed in another patent document (Japanese Unexamined Patent Application, Publication No. 2005-250040) invented by the same inventor as Patent Document 3, NA is also increased by approximately 10% depending on the refractive index of the cladding. Therefore, as described above, there is a problem that signal light propagating from an optical fiber having a large NA to an optical fiber having a small NA is likely to leak from the core.

Patent Document 4 discloses an optical fiber for a fiber laser including a core to which a rare-earth element is added and a cladding formed around the core, in which the core has a virtual temperature of 1720° C. to 2000° C. and the virtual temperature is different in the longitudinal direction. Moreover, Patent Document 4 discloses a production method for the optical fiber for a fiber laser, including an optical fiber bare wire manufacturing step of melting an optical fiber base material to manufacture an optical fiber bare wire including a core to which a rare-earth element is added and a cladding formed around the core and a coating step of forming a coat around the optical fiber bare wire, in which a residual stress application step of applying residual stress to the inside of the core so that a virtual temperature of the core is between 1720° C. and 2000° C. is provided between the optical fiber bare wire manufacturing step and the coating step or after the coating step. Patent Document 4 discloses that a step of radiating a laser beam to the optical fiber bare wire to apply the residual stress to the inside of the core may be performed between the optical fiber bare wire manufacturing step and the coating step as the residual stress application step and that a step of applying tensile to apply the residual stress to the inside of the core may be performed after the coating step as the residual stress application step.

However, even when the virtual temperature is changed in the range of 1720° C. to 2000° C., as read from the diagrams disclosed in Patent Document 4, the fluorescence intensity which is the strength of electromagnetic waves emitted when electrons excited by the rare-earth element in the core absorbing radiated excitation light energy returns to the ground state is changed by approximately 1.18 times at an excitation wavelength of 974 nm. Therefore, there is a problem that the control range of light absorption coefficient is narrower than that of the technology disclosed in Patent Document 3. Since a control range of light absorption coefficient is narrow, the change in refractive index is relatively as small as approximately 1.4651 to 1.4658. However, since NA is changed by approximately several percents, there is a problem that signal light propagating from an optical fiber having a large NA to an optical fiber having a small NA is likely to leak from the core.

Patent Document 1: Japanese Unexamined Patent Application, Publication No. 2009-32910
Patent Document 2: Japanese Unexamined Patent Application, Publication No. 2009-129989
Patent Document 3: Japanese Unexamined Patent Application, Publication No. 2008-308361
Patent Document 4: Japanese Unexamined Patent Application, Publication No. 2010-103223

SUMMARY OF THE INVENTION

As described above, in the conventional optical fibers for a fiber laser, a number of methods for controlling an absorption coefficient or an absorption loss of excitation light in the core to suppress the increase in temperature of the excitation light introduction end and to maintain the temperature in the longitudinal direction to be uniform have been tried. However, there are problems associated with performance that excited signal light is likely to leak from the core and a control range of absorption coefficient of the excitation light is narrow and problems associated with production method that the production cost is very high and there is concern about reliability.

The present invention has been made in view of the above-described problems, and an object thereof is to provide an optical fiber for a fiber laser in which a control range of an absorption coefficient is as wide as a required range, and the leakage of signal light from a core is suppressed and which can be produced at an allowable range of cost and is highly reliable and to provide a production method capable of producing the optical fiber for a fiber laser. Another object of the present invention is to provide a high-power fiber laser which uses an optical fiber for a fiber laser having the above-described properties and is highly reliable.

(1) An optical fiber for a fiber laser according to the present invention is an optical fiber for a fiber laser (for example, an optical fiber for a fiber laser 1 to be described later) including a core (for example, a core 2 to be described later) to which a rare-earth element is added, a first cladding (for example, a first cladding 3 to be described later) formed around the core; and a second cladding (for example, a second cladding 4 to be described later) formed around the first cladding, in which excitation light is guided from at least one end of the first cladding to excite the rare-earth element to output a laser oscillation light, wherein an addition concentration of the rare-earth element to the core is different in a longitudinal direction of the optical fiber for a fiber laser, and a core diameter and a numerical aperture of the optical fiber for a fiber laser are constant in the longitudinal direction of the optical fiber for a fiber laser.

(2) In the optical fiber for a fiber laser according to (1), the addition concentration of the rare-earth element to the core in a region closer to the end that guides the excitation light in the longitudinal direction of the optical fiber for a fiber laser may be lower than that in the other region.

(3) In the optical fiber for a fiber laser according to (1) or (2), a refractive index adjustment element that changes a refractive index of the core may be added to the core so as to cancel change in the refractive index of the core resulting from change in the addition concentration of the rare-earth element to the core and maintain the refractive index of the core to be constant in the longitudinal direction of the optical fiber for a fiber laser.

(4) In the optical fiber for a fiber laser according to (1) or (2), a numerical aperture adjustment element that changes a refractive index of the first cladding may be added to the first cladding so that a numerical aperture of the optical fiber for a fiber laser is maintained to be constant in the longitudinal direction of the optical fiber for a fiber laser with respect to change in a numerical aperture of the optical fiber for a fiber laser occurring due to change in a refractive index of the core due to change in the addition concentration of the rare-earth element to the core.

(5) A fiber laser (for example, a fiber laser 5, 105 to be described later) according to the present invention includes: the optical fiber for a fiber laser according to any one of (1) to (4); a tapered fiber bundle (for example, a tapered fiber bundle 10 to be described later) connected to an end of the optical fiber for a fiber laser; and a plurality of light sources (for example, a laser diode module 9 to be described later) that emit excitation light to be guided to the first cladding of the optical fiber for a fiber laser via the tapered fiber bundle.

(6) In the fiber laser according to (5), an addition concentration distribution of the rare-earth element may be controlled in the longitudinal direction of the optical fiber for a fiber laser so that the temperature of the optical fiber for a fiber laser during rated optical output or maximum optical output is uniform in the longitudinal direction of the optical fiber for a fiber laser.

(7) In the fiber laser according to (5), the fiber laser may guide excitation light to the first cladding from one direction, and an addition concentration distribution of the rare-earth element may be controlled in the longitudinal direction of the optical fiber for a fiber laser so that the temperature of the optical fiber for a fiber laser during rated optical output or maximum optical output is constant in a length portion of 50% or more from the end that guides the excitation light among the entire length of the optical fiber for a fiber laser and is lower than the constant temperature in a remaining length portion.

(8) In the fiber laser according to any one of (5) to (7), at least a portion of the optical fiber for a fiber laser may be provided on an inner side of a groove (for example, a groove 16a to be described later) formed in a cooling plate (for example, a cooling plate 16 to be described later) formed of a thermoconductive member, the groove being deeper than at least an outer diameter of the optical fiber for a fiber laser, with the aid of a thermoconductive adhesive (for example, a thermoconductive adhesive 17 to be described later) or a thermoconductive paste.

(9) In the fiber laser according to (8), the optical fiber for a fiber laser may have a portion in which fibers cross each other, and the cooling plate may be configured such that, in the portion in which the optical fibers for a fiber laser cross each other, a depth of the grooves (for example, a groove 16*a* to be described later) in which one of the crossing optical fibers for a fiber laser are provided is different from a depth of the groove (for example, a groove 16*b* to be described later) in which the other crossing optical fibers for a fiber laser are provided so that the crossing optical fibers for a fiber laser do not make contact with each other or such that a bridge (for example, a bridge 160 to be described later) formed of a thermoconductive member is provided to extend over the groove (for example, a groove 6*a* to be described later) in which one of the crossing optical fibers for a fiber laser are provided and the other crossing optical fibers for a fiber laser are provided on the bridge.

(10) A fiber laser (for example, a fiber laser 205 to be described later) according to the present invention includes: a plurality of the fiber lasers according to any one of (5) to (9); and a beam combiner (for example, a beam combiner 18 to be described later) that combines laser outputs emitted from the plurality of fiber lasers to one optical fiber.

(11) A production method for the optical fiber for a fiber laser according to the present invention is a production method for the optical fiber for a fiber laser according to any one of (1) to (3) including: stacking a plurality of disks (for example, a disk 304 to be described later) formed of silica glass in which an addition concentration of the rare-earth element is changed in a thickness direction on an inner side of a hollow silica glass tube (for example, a tube 305 to be described later); fusing the tube and the disk together by heating to manufacture a preform (for example, a preform 307 to be described later); and performing wire drawing while heating the preform.

(12) A production method for the optical fiber for a fiber laser according to the present invention is a production method for the optical fiber for a fiber laser according to any one of (1) to (3) including: allowing a soot to grow while periodically changing an addition concentration of the rare-earth element in an axial direction by a vapor phase axial deposition method to manufacture a soot body (for example, a soot body 402 to be described later); subjecting the soot body to silica vitrification to manufacture a rod (for example, a rod 405, 405*a* to be described later); disposing the rod on an inner side of a hollow silica glass tube (for example, a tube 407 to be described later) to manufacture a rod-in-tube (for example, a rod-in-tube 408 to be described later); allowing the rod-in-tube to collapse to manufacture a preform (for example, a preform 410 to be described later); and performing wire drawing while heating the preform.

(13) A production method for the optical fiber for a fiber laser according to the present invention is a production method for the optical fiber for a fiber laser according to any one of (1) to (3) including: supplying raw gas to the inner side of the hollow silica glass tube (for example, a tube 502 to be described later) to deposit the silica glass by a plasma activated chemical vapor deposition method while changing a concentration of the rare-earth element periodically according to movement in the longitudinal direction of the tube, of a deposition position of silica glass where a high-frequency induction thermal plasma is generated (for example, a high-frequency induction thermal plasma 504 to be described later) in the tube; allowing the tube to collapse to manufacture a preform (for example, a preform 506 to be described later); and performing wire drawing while heating the preform.

(14) A production method for the optical fiber for a fiber laser according to the present invention is a production method for the optical fiber for a fiber laser according to (4) including: allowing a soot to grow while changing an addition concentration of the rare-earth element periodically in an axial direction to manufacture a soot body by a vapor phase axial deposition method; subjecting the soot body to silica vitrification to manufacture a rod (for example, a rod 601 to be described later); depositing silica glass serving as the first cladding to an outer surface of the rod serving as a core base material in an axial direction by a plasma activated outside vapor deposition method while changing a concentration of a numerical aperture adjustment element included in a raw gas so as to be identical to a period in the axial direction of the rod, of the change in the addition concentration of the rare-earth element included in the core base material to manufacture a preform (for example, a preform 604 to be described later); and performing wire drawing while heating the preform.

(15) In the production method for the optical fiber for a fiber laser according to (12) or (14), a manufacturing device for manufacturing the soot body may include a plurality of burners (for example, a burner 406 to be described later) for depositing the soot by an oxyhydrogen flame hydrolysis method of a silicon tetrachloride and a surface shape monitoring device (for example, a surface shape monitoring device 411 to be described later) that monitors a surface shape of a soot deposition surface (for example, a soot deposition surface 402*a* to be described later), and a monitoring result obtained by the surface shape monitoring device may be provided as a feedback and the soot may be deposited while adjusting heating power of the burners so that a surface shape of the soot deposition surface is kept to be a flat surface vertical to a central axis of the soot body.

According to the present invention, it is possible to provide an optical fiber for a fiber laser in which a control range of an absorption coefficient is as wide as a required range, and the leakage of signal light from a core is suppressed and which can be produced at an allowable range of cost and is highly reliable and to provide a production method capable of producing the optical fiber for a fiber laser. According to the present invention, it is possible to provide a high-power fiber laser which uses an optical fiber for a fiber laser having the above-described properties and is highly reliable.

BRIEF DESCRIPTION OF THE DRAWINGS

FIG. 25B is a schematic diagram of production steps for describing a production method for an optical fiber for a fiber laser according to the tenth embodiment of the present invention.

FIG. 25C is a schematic diagram of production steps for describing a production method for an optical fiber for a fiber laser according to the tenth embodiment of the present invention.

DETAILED DESCRIPTION OF THE INVENTION

Figure 1A:
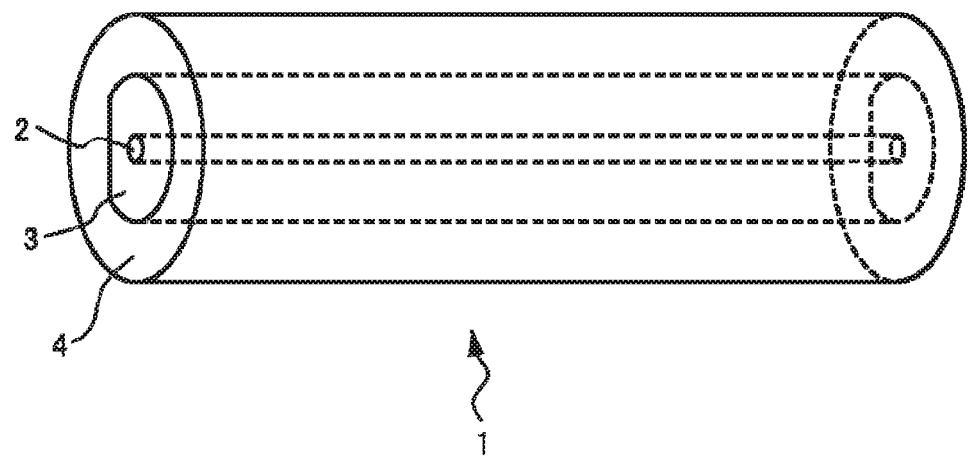
FIG. 1A is a schematic diagram illustrating an optical fiber for a fiber laser according to a first embodiment of the present invention and is a schematic perspective view of the optical fiber for a fiber laser.

Hereinafter, embodiments of an optical fiber for a fiber laser, a fiber laser, and an optical fiber for a fiber laser production method according to the present invention will be described with reference to the drawings. In the drawings, the same members are denoted by the same reference numerals. Moreover, it is assumed that components denoted by the same reference numerals in different drawings have the same functions. In these drawings, the scales are changed appropriately for better understanding of the drawings.

As described above, in the present specification, a term "optical fiber for a fiber laser" is used to mean an amplification optical fiber having a double-clad fiber structure unless particularly stated otherwise. In the respective embodiments of the present specification, although only Yb (Ytterbium) is described as an example of a rare-earth element to be added to a core, this is an example, and the rare-earth element may be an arbitrary element if it achieves the same function and is not limited to Yb.

First Embodiment

Figure 1B:
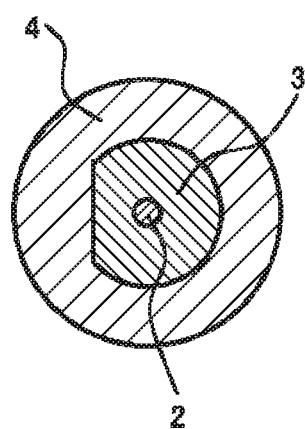
FIG. 1B is a schematic diagram illustrating the optical fiber for a fiber laser according to the first embodiment of the present invention and is a schematic cross-sectional view of the optical fiber for a fiber laser illustrated in FIG. 1A.

FIG. 1A is a schematic diagram illustrating an optical fiber for a fiber laser according to a first embodiment of the present invention and is a schematic perspective view of the optical fiber for a fiber laser. FIG. 1B is a schematic diagram illustrating the optical fiber for a fiber laser according to the first embodiment of the present invention and is a schematic cross-sectional view of the optical fiber for a fiber laser illustrated in FIG. 1A. An optical fiber for a fiber laser 1 includes a core 2, a first cladding 3 disposed around the core 2, and a second cladding 4 disposed around the first cladding 3. The optical fiber for a fiber laser 1 guides excitation light from an excitation light introduction end using at least one end of the first cladding 3 as the excitation light introduction end to excite a rare-earth element and outputs laser oscillation light. A core diameter of the core 2 is constant in a longitudinal direction of the optical fiber for a fiber laser 1.

As illustrated in FIG. 1B, a cross-section of the first cladding 3 is not a circular cross-section but is a D-shaped cross-section (a shape obtained by removing a portion surrounded by an arc and a chord from a circle). In the first cladding (an excitation cladding) 3 for a high-power fiber laser, a coaxial circular cross-section as used in optical communication is not suitable since a spatial hole burning of a transverse mode occurs in excitation light absorption. That is, from the law of reflection (incident angle=exit angle) in a cross-section, since all beams reflected from a circumference maintain a constant distance from an optical axis, a light beam that do not enter the core first will not encounter the core or be absorbed even if the light beam is reflected repeatedly. Therefore, in addition to an excitation cladding having the D-shaped cross-section illustrated in FIGS. 1A and 1B, a rectangular excitation cladding having a rectangular cross-section or a polygonal excitation cladding having a polygonal cross-section although these excitation claddings are not illustrated can be also used as the first cladding 3. However, in order to simplify the description, in the following description, it is assumed that the first cladding 3 has an approximately circular cross-section, and a term "cladding diameter" is used. In the present embodiment, at least the first cladding diameter among the first cladding diameter and the second cladding diameter is constant in the longitudinal direction of the optical fiber for a fiber laser 1.

Figure 2:
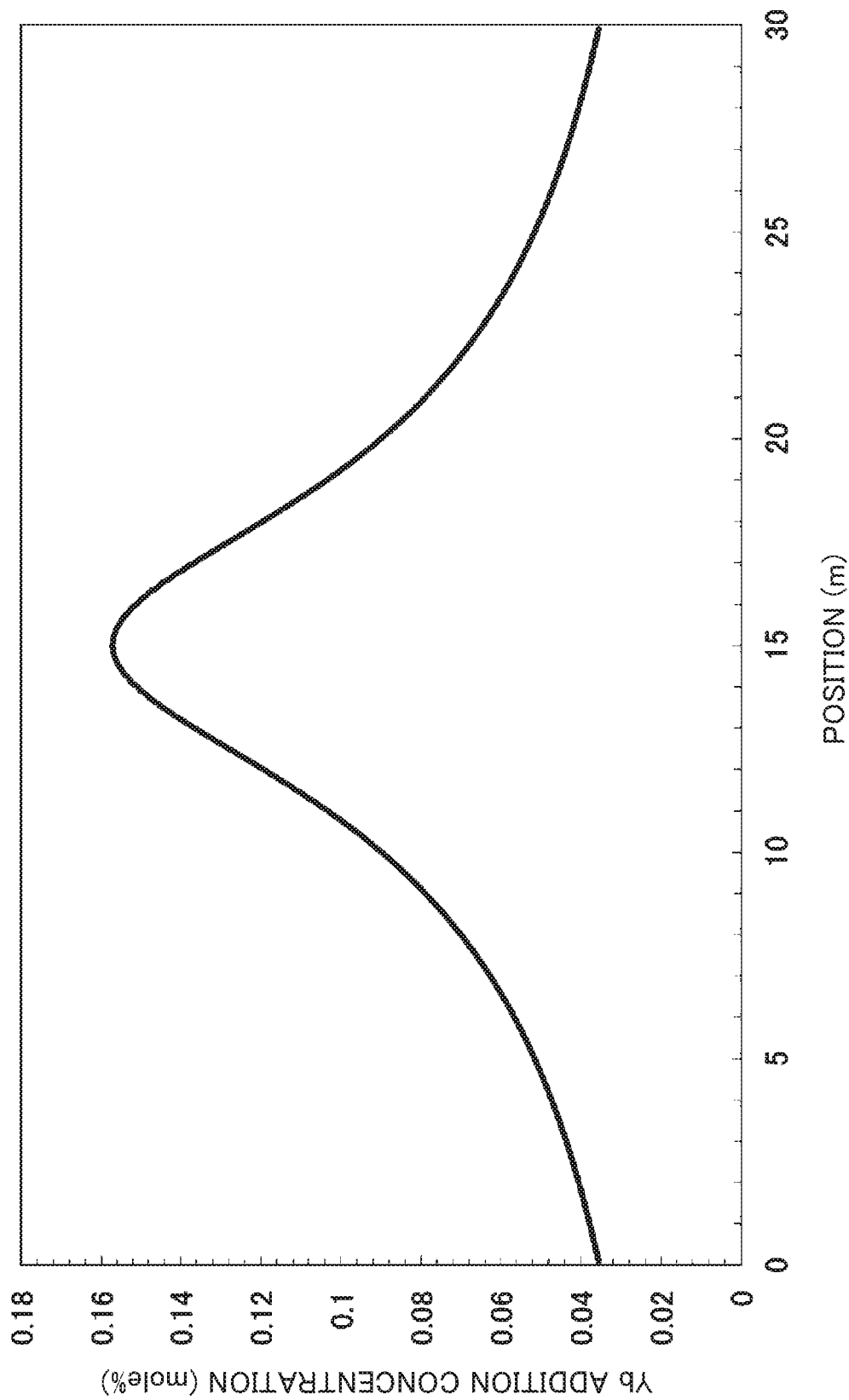
FIG. 2 is a graph illustrating a distribution example in a longitudinal direction of the optical fiber for a fiber laser, of a Yb addition concentration in the optical fiber for a fiber laser according to the first embodiment of the present invention.

FIG. 2 illustrates a mole concentration distribution of Yb which is a rare-earth element added to the core 2 in the longitudinal direction of the optical fiber for a fiber laser 1 illustrated in FIGS. 1A and 1B. In the present embodiment, an example in which both ends of the optical fiber for a fiber laser 1 are excitation light introduction ends and excitation light of 3.16 kW is guided from each end to obtain a laser output of 5 kW is illustrated. Moreover, an effective length of the optical fiber for a fiber laser 1 is 30 m.

As illustrated in FIG. 2, the addition concentration of Yb to the core 2 in a region closer to an end to which excitation light is guided in the longitudinal direction of the optical fiber for a fiber laser 1 is lower than that of the other region (a central region in the longitudinal direction of the optical fiber for a fiber laser 1). Here, assuming that an absorption characteristic is represented by an absorption loss which can be represented by Expression 1 below, an absorption loss distribution in the longitudinal direction of the optical fiber for a fiber laser 1 was calculated.

[Math. 1]

$$\alpha_{clad} = \alpha_{core} / \alpha_{clad} \alpha_{core} \quad \text{(Expression 1)}$$

In Expression 1, $\alpha_{clad}$ is an absorption loss to the core 2, of excitation light propagating through the first cladding 3. $\alpha_{core}$ is an absorption loss due to Yb added to the core 2. $\alpha_{clad}$ is a cross-sectional area of the first cladding 3. $\alpha_{core}$ is a mode cross-sectional area of the core. The unit of $\alpha_{clad}$ and $\alpha_{core}$ is dB/m. In the present specification, the unit of the Yb addition concentration is mole % and $\alpha_{core} = 0.08 \times (\text{Yb addition concentration})$.

In the present specification, since the optical fiber for a fiber laser 1 having a relatively large core diameter is used as an embodiment, mode cross-sectional area of the core 2 is approximated to the cross-sectional area of the core 2. Moreover, in the present specification, from the same reason, a term "mode field diameter" is not used but is unified to a core diameter. However, light propagating through a single-mode optical fiber having a small core diameter does not concentrate on a core but leaches into the first cladding. Therefore, for a single-mode optical fiber, it is preferable to use a mode field diameter calculated from a light energy distribution rather than the core diameter. Therefore, in the case of a single-mode optical fiber, "a core diameter and a numerical aperture of the optical fiber for a fiber laser are constant in a longitudinal direction of the optical fiber for a fiber laser" in Claim 1, for example, may be read "a mode field diameter and a numerical aperture of the optical fiber for a fiber laser are constant in a longitudinal direction of the optical fiber for a fiber laser".

Figure 3:
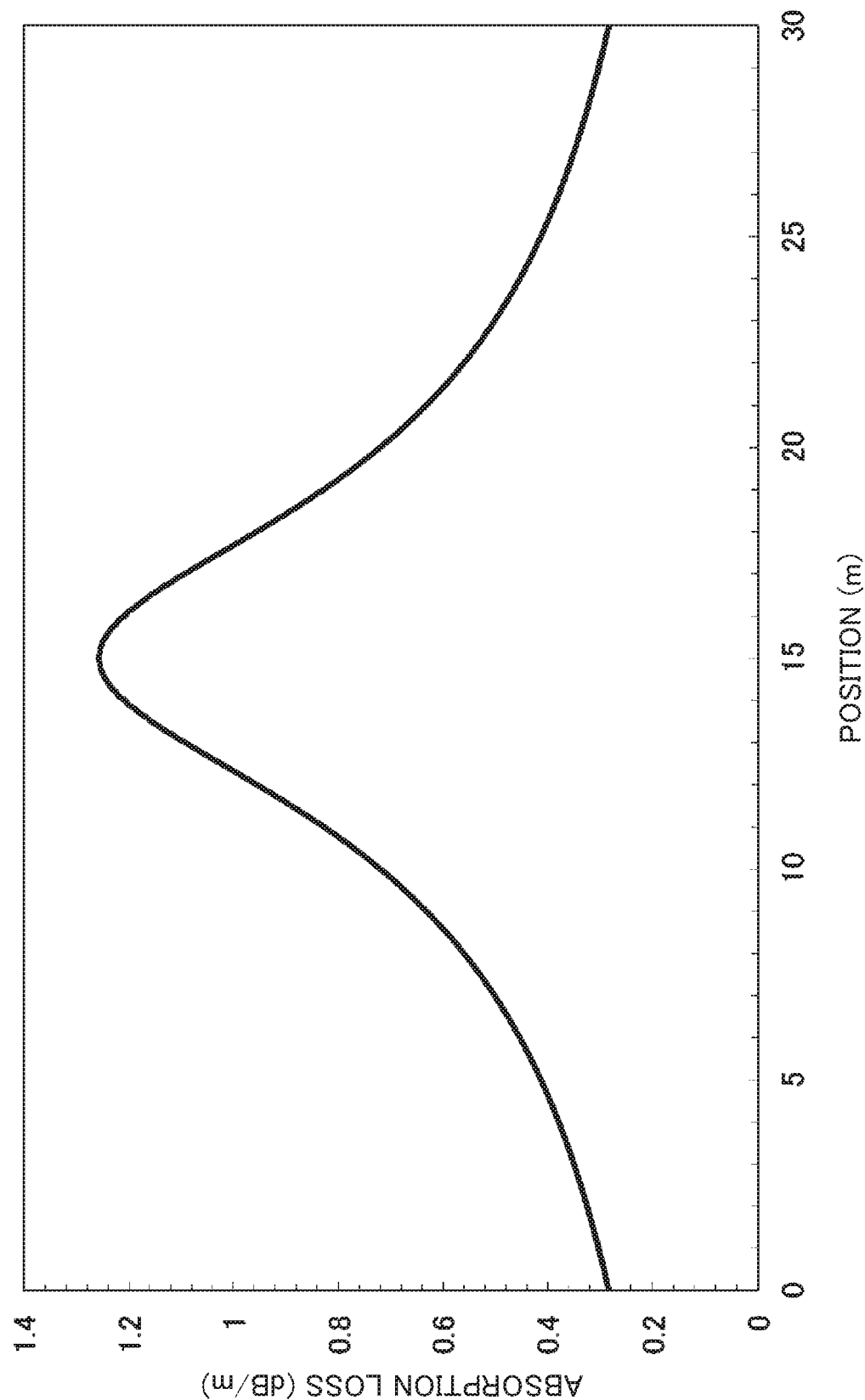
FIG. 3 is a graph illustrating a distribution example in the longitudinal direction of the optical fiber for a fiber laser, of an absorption loss in the optical fiber for a fiber laser according to the first embodiment of the present invention.

FIG. 3 is a graph illustrating an absorption loss distribution in the longitudinal direction of the optical fiber for a fiber laser 1 calculated by applying Expression 1 under conditions of core diameter=35 μm (constant) and cladding diameter=350 μm (constant) in FIG. 2. As illustrated in FIG. 3, an absorption loss of the optical fiber for a fiber laser 1 in a region closer to an end to which excitation light is guided in the longitudinal direction of the optical fiber for a fiber laser 1 is lower than that of the other region (a central region in the longitudinal direction of the optical fiber for a fiber laser 1) similarly to the addition concentration distribution of Yb illustrated in FIG. 2.

Figure 4:
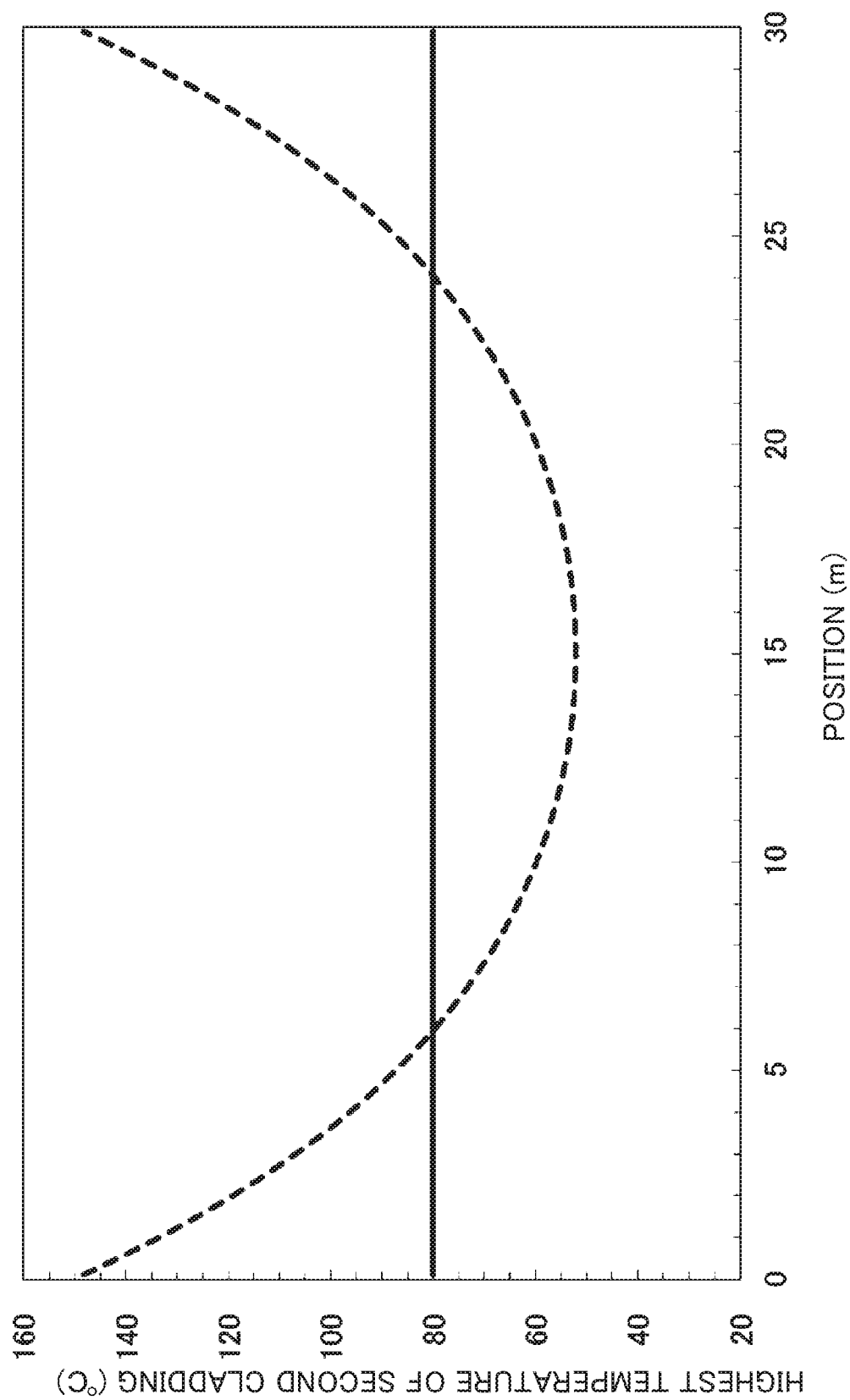
FIG. 4 is a graph illustrating a distribution example in the longitudinal direction of the optical fiber for a fiber laser, of a highest temperature of a second cladding of the optical fiber for a fiber laser according to the first embodiment of the present invention.

FIG. 4 is a graph illustrating a distribution example in the longitudinal direction of the optical fiber for a fiber laser 1, of a highest temperature of the second cladding 4 of the optical fiber for a fiber laser 1. Here, a solid-line graph in FIG. 4 is a graph plotting a highest temperature of the second cladding 4 of which heat resistance is assumed to be lower than that of the core 2 and the first cladding 3 in the longitudinal direction of the optical fiber for a fiber laser 1, obtained by a thermal fluid simulation.

A cooling condition of the optical fiber for a fiber laser 1 in the thermal fluid simulation is as follows. Materials of the core 2 and the first cladding 3 were $SiO_2$. The second cladding 4 was a polymer (a thermal conductivity: 0.21 W/(m·K)) having an outer diameter of 750 μm. A thermoconductive adhesive (a thermal conductivity: 2 W/(m·K)) was applied to a thickness of 0.2 mm on a water-cooling plate (a thermal conductivity: 180 W/(m·K)) formed of an aluminum alloy cooled by a cooling water of 25° C. The optical fiber for a fiber laser 1 was mounted on the thermoconductive adhesive and the optical fiber for a fiber laser 1 was fixed by pushing into the thermoconductive adhesive until the circumference of the second cladding 4 makes contact with the surface of the water-cooling plate.

By changing the addition concentration of Yb as illustrated in FIG. 2, as illustrated in the solid-line graph in FIG. 4, the highest temperature of the second cladding 4 can be maintained to be substantially uniform in the longitudinal direction of the optical fiber for a fiber laser 1. A broken-line graph in FIG. 4 illustrates a temperature when an optical fiber for a fiber laser in which Yb was added uniformly to the core in a concentration of 0.08 mole % in the longitudinal direction of the optical fiber for a fiber laser so that the same absorptivity is obtained in the entire optical fiber for a fiber laser was used. In this case, it is understood the temperature at both ends to which excitation light is guided increases considerably.

As is clear from FIG. 3, in order to maintain the temperature in the longitudinal direction of the optical fiber for a fiber laser 1 to be substantially uniform, it is necessary to change the absorption loss in the longitudinal direction of the optical fiber for a fiber laser 1 by approximately four times. In contrast, in the conventional technology disclosed in Patent Documents 3 and 4, it is clear that the absorption coefficient is changed by approximately 1.2 to 1.4 times only and a control range of the absorption coefficient is too narrow.

If the addition concentration of Yb to the core 2 only is changed, the refractive index of the core 2 also changes. When the refractive index of the core 2 changes, as illustrated in Expression 2 below, the numerical aperture (NA) of the optical fiber for a fiber laser 1 also changes and a problem that signal light propagating from an optical fiber having a large numerical aperture (NA) to an optical fiber having a small numerical aperture is likely to leak from the core occurs as in the conventional technology. In the present specification, a term "signal light" is used to mean a laser beam generated by being selectively reflected from a high reflector-fiber Bragg grating (HRFBG) and a low-reflectivity output coupler-fiber Bragg grating (OCFBG) and repeated stimulated emission in a laser resonator formed by providing the high reflector-fiber Bragg grating (HRFBG) and the low-reflectivity output coupler-fiber Bragg grating (OCFBG) that reflect light of a specific wavelength on both sides of the optical fiber for a fiber laser 1.

[Math. 2]

$$NA=\sqrt{n_{core}^2-n_{clad}^2}$$ (Expression 2)

In Expression 2, $n_{core}$ and $n_{clad}$ are refractive indices of the core 2 and the first cladding 3, respectively. Therefore, in the optical fiber for a fiber laser 1, in order to prevent leakage of signal light from the core 2, the core diameter and the numerical aperture (NA) are set to be constant in the longitudinal direction of the optical fiber for a fiber laser 1. Here, when the addition concentration of Yb to the core 2 is increased by 1 mole %, the refractive index of the core 2 is increased by 0.007332. Therefore, it is desirable to add a refractive index adjustment element to the core 2 to cancel change in the refractive index of the core 2 so that the refractive index of the core 2 is maintained to be constant in the longitudinal direction of the optical fiber for a fiber laser 1. In the present specification, "constant" is used to mean that a state in which a value is constant in design rather than a state in which a value is strictly constant without any variation. Therefore, a state in which a value varies due to an error or the like also falls within the concept of "constant".

F (fluorine) and B (boron) is known as a refractive index adjustment element (that is, an element that decreases the refractive index of the core 2 by being added to the core 2). For example, when F is used, the refractive index is decreased by 0.00425 if the addition concentration of F is increased by 1 mole %. Therefore, in order to maintain the refractive index of the core 2 to be constant in the longitudinal direction of the optical fiber for a fiber laser 1, it is desirable that F having a concentration of 1.725 times a change in the addition concentration of Yb to the core 2 in the longitudinal direction of the optical fiber for a fiber laser 1 is added to the core 2.

Figure 5:
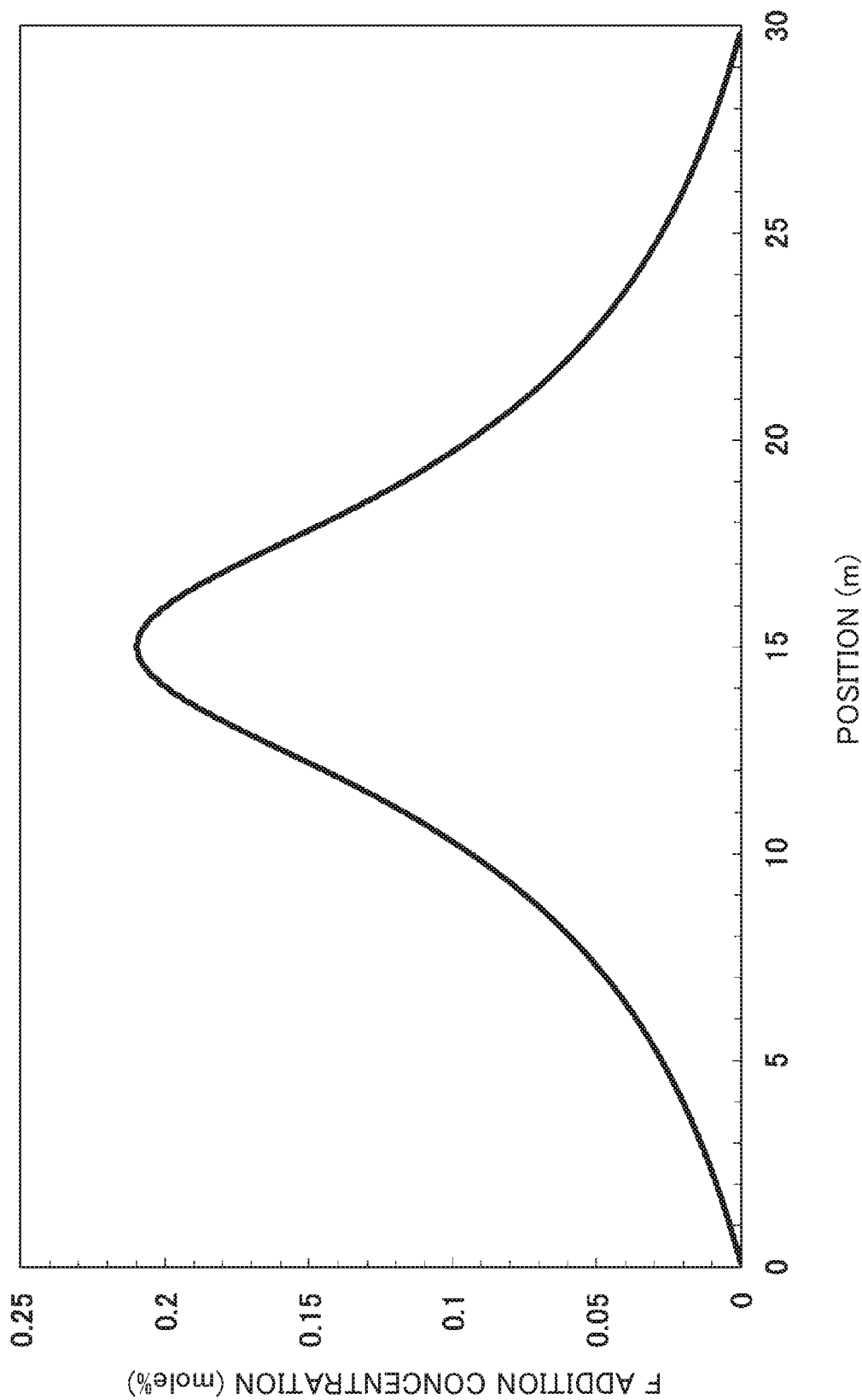
FIG. 5 is a graph illustrating a distribution example in the longitudinal direction of the optical fiber for a fiber laser, of an addition concentration of F which is a refractive index adjustment element to a core, in the optical fiber for a fiber laser according to the first embodiment of the present invention.

FIG. 5 illustrates an example of an addition concentration distribution of F to the core 2 for cancelling change in the refractive index due to change in the addition concentration of Yb illustrated in FIG. 2. As illustrated in FIG. 5, the addition concentration of F to the core 2 in the longitudinal direction of the optical fiber for a fiber laser 1 in a region closer to an end to which excitation light is guided in the longitudinal direction of the optical fiber for a fiber laser 1 is lower than that of the other region (a central region in the longitudinal direction of the optical fiber for a fiber laser 1). Due to this, it is possible to suppress change in the refractive index of the core 2 occurring due to change in the addition concentration of Yb. When the change in the refractive index of the core 2 is suppressed, the change in the numerical aperture (NA) of the optical fiber for a fiber laser 1 is suppressed, and leakage of signal light from the core 2 can be suppressed.

In order to cancel the change in the refractive index of the core 2 resulting from the change in the addition concentration of Yb added to the core 2, an element which increases the refractive index when added may be used as a refractive index adjustment element to be added to the core 2. P (phosphorus), Ge (germanium), Al (aluminum), Ti (titanium), Zr (zirconium), and the like are known as elements that increase the refractive index when added. For example, when Ge is used, if the addition concentration of Ge is increased by 1 mole %, the refractive index is increased by 0.00125.

Figure 6:
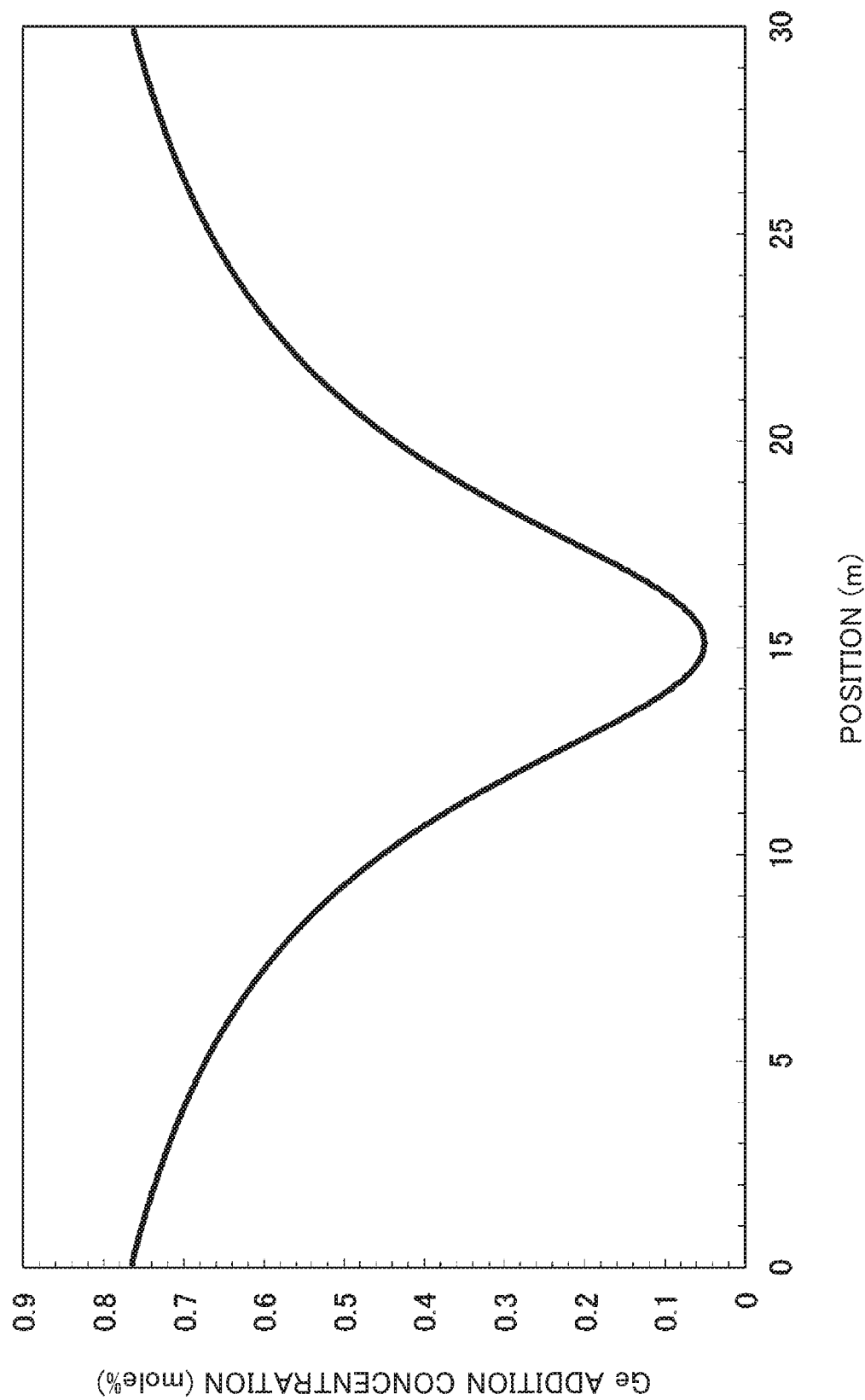
FIG. 6 is a graph illustrating a distribution example in the longitudinal direction of the optical fiber for a fiber laser, of an addition concentration of Ge which is a refractive index adjustment element to a core, in the optical fiber for a fiber laser according to the first embodiment of the present invention.

FIG. 6 illustrates an example of an addition concentration distribution of Ge to the core 2 for cancelling the change in the refractive index due to the change in the addition concentration of Yb illustrated in FIG. 2. As illustrated in FIG. 6, the addition concentration of Ge to the core 2 in the longitudinal direction of the optical fiber for a fiber laser 1 in a region closer to an end to which excitation light is guided in the longitudinal direction of the optical fiber for a fiber laser 1 is higher than that of the other region (a central region in the longitudinal direction of the optical fiber for a fiber laser 1). Due to this, it is possible to suppress the change in the refractive index of the core 2 occurring due to the change in the addition concentration of Yb. When the change in the refractive index of the core 2 is suppressed, the change in the numerical aperture (NA) of the optical fiber for a fiber laser 1 is suppressed, and the leakage of signal light from the core 2 can be suppressed.

As described above, according to the optical fiber for a fiber laser 1 of the first embodiment, even when the addition concentration of the rare-earth element to the core 2 is changed for the purpose of controlling the absorption coefficient or the absorption loss of the excitation light in the longitudinal direction of the optical fiber for a fiber laser 1 in order to maintain the temperature distribution in the longitudinal direction of the optical fiber for a fiber laser 1 to be uniform, it is possible to suppress the change in the refractive index of the core 2 by adding a refractive index adjustment element. In this way, it is possible to suppress the change in the numerical aperture (NA) of the optical fiber for a fiber laser 1 and to suppress the leakage of signal light from the core 2 as much as possible. Therefore, it is possible to provide the optical fiber for a fiber laser 1 in which a control range of an absorption coefficient is as wide as a required range, and the leakage of signal light from the core 2 is suppressed and which can be produced at an allowable range of cost and is highly reliable.

Moreover, the addition concentration of the rare-earth element to the core 2 in the longitudinal direction of the optical fiber for a fiber laser 1 in a region closer to an end to which excitation light is guided in the longitudinal direction of the optical fiber for a fiber laser 1 is lower than that of the other region. Therefore, it is possible to suppress an increase in temperature at an excitation light guiding-side end where the amount of excitation light absorbed in the core 2 increases and the temperature is likely to rise.

Second Embodiment

Figure 7:
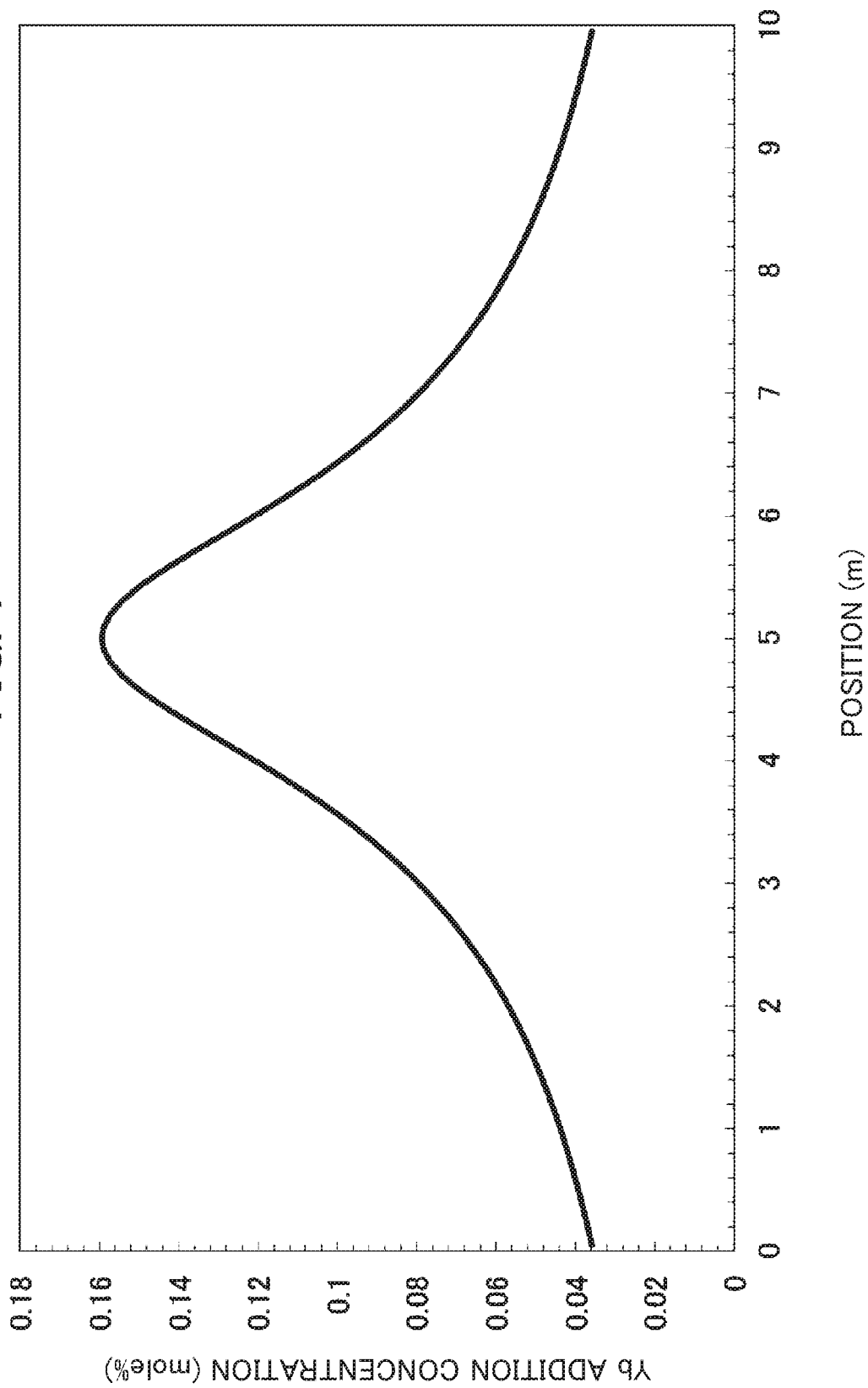
FIG. 7 is a graph illustrating a distribution example in a longitudinal direction of an optical fiber for a fiber laser, of a Yb addition concentration in an optical fiber for a fiber laser according to a second embodiment of the present invention.

FIG. 7 illustrates a distribution in the longitudinal direction of an optical fiber for a fiber laser, of a mole concentration of Yb added to a core, in an optical fiber for a fiber laser according to a second embodiment of the present invention. Since the optical fiber for a fiber laser 1 of the first embodiment described above is relatively as long as 30 m, the thermal condition is not so severe. However, a threshold power $P_{cr}$ that gives a threshold of stimulated Raman scattering is 5.1 kW when calculated by Expression 3 below. In this case, if a feed fiber or a delivery fiber is connected to a laser exit end of the optical fiber for a fiber laser 1, occurrence of stimulated Raman scattering may incur a problem in a laser output of 5 kW. Therefore, in the present embodiment, the length of the optical fiber for a fiber laser 1 is set to 10 m, and the refractive index of the first cladding 3 is changed with the change in the numerical aperture (NA) of the optical fiber for a fiber laser 1 which can occur due to the change in the refractive index of the core 2 due to the change in the addition concentration of Yb to the core 2 so that the numerical aperture (NA) of the optical fiber for a fiber laser 1 in the longitudinal direction of the optical fiber for a fiber laser 1 is maintained to be constant. Hereinafter, the present embodiment will be described.

[Math. 3]

$$P_{cr} \approx 16\, A_{\mathit{eff}}/g_R L \quad \text{(Expression 3)}$$

In Expression 3, $A_{\mathit{eff}}$ is an effective mode area (m$^2$). Since the core diameter is relatively large, $A_{\mathit{eff}}$ is substantially equal to a core cross-sectional area. $g_R$ is a Raman gain, and in the case of silica, is approximately $1 \times 10^{-13}$ m/W for a wave length of 1 µm. L is the length (m) of the optical fiber for a fiber laser 1.

Since the threshold power $P_{cr}$ that gives a threshold of stimulated Raman scattering is inverse-proportional to the length of the optical fiber for a fiber laser 1, when the optical fiber for a fiber laser 1 is shortened to 10 m, the threshold power $P_{cr}$ is increased up to 15.4 kW. When the optical fiber for a fiber laser 1 is shortened, excitation light that is not absorbed in the core 2 increases unless the absorption loss per unit length is increased. Therefore, in the present embodiment, the core diameter is set to 35 µm (constant) similarly to the first embodiment and the first cladding diameter was decreased to 200 µm. The excitation light guiding condition is the same as that of the first embodiment.

Figure 8:
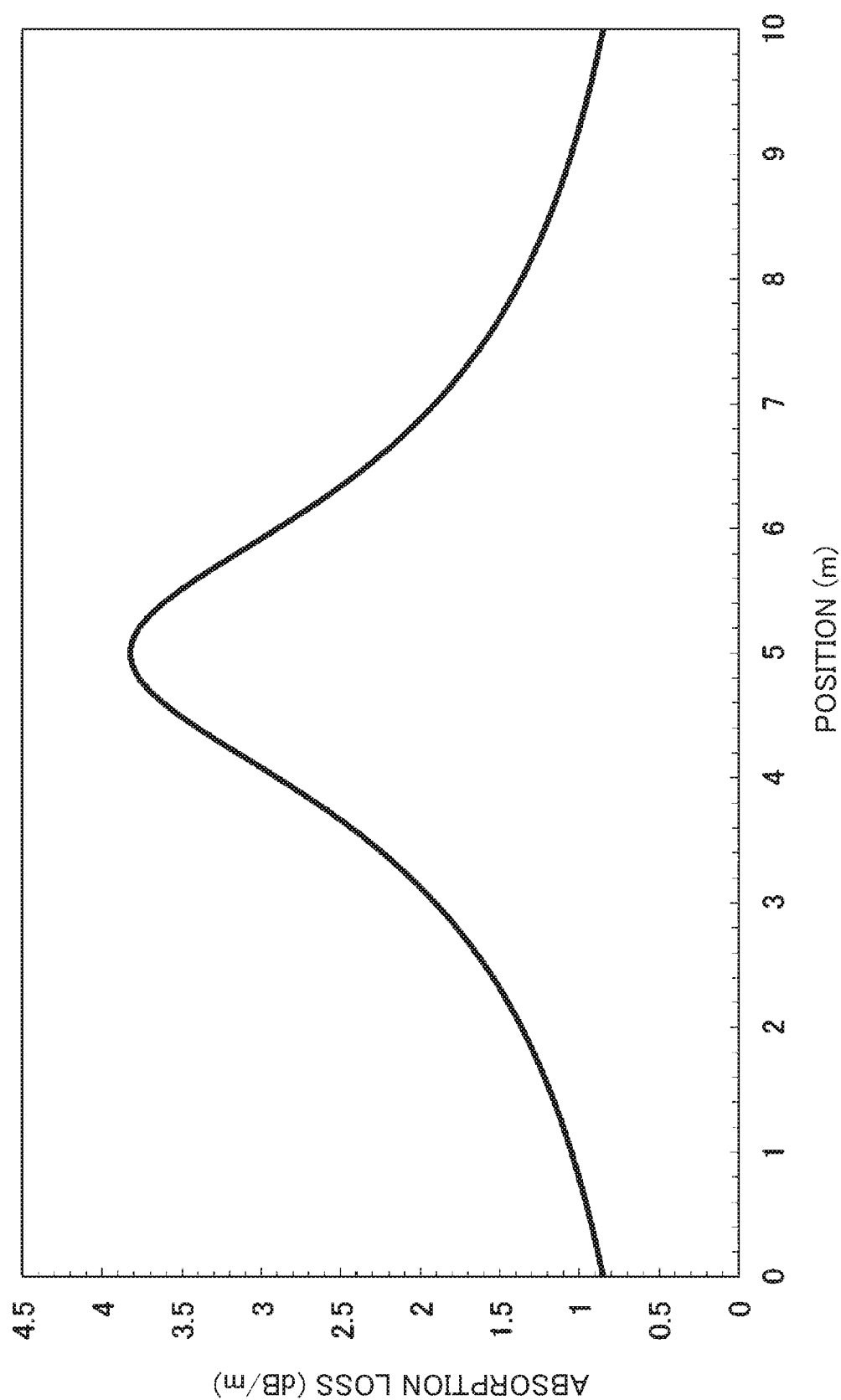
FIG. 8 is a graph illustrating a distribution example in the longitudinal direction of the optical fiber for a fiber laser, of an absorption loss in the optical fiber for a fiber laser according to the second embodiment of the present invention.

As described above, FIG. 7 illustrates a mole concentration distribution of Yb added to the core 2 in the longitudinal direction of the optical fiber for a fiber laser 1 of the present embodiment. FIG. 8 illustrates a distribution of an absorption loss in the longitudinal direction of the optical fiber for a fiber laser 1 calculated by applying Expression 1 described above to the addition concentration distribution of Yb illustrated in FIG. 7. As illustrated in FIG. 7, the addition concentration of Yb to the core 2 in the longitudinal direction of the optical fiber for a fiber laser 1 in a region closer to an end to which excitation light is guided in the longitudinal direction of the optical fiber for a fiber laser 1 is lower than that of the other region (a central region in the longitudinal direction of the optical fiber for a fiber laser 1). Moreover, as illustrated in FIG. 8, the absorption loss of the optical fiber for a fiber laser 1 in a region closer to an end to which excitation light is guided in the longitudinal direction of the optical fiber for a fiber laser 1 similarly to the addition concentration distribution of Yb illustrated in FIG. 7 is lower than that of the other region (a central region in the longitudinal direction of the optical fiber for a fiber laser 1).

In the present embodiment, although the optical fiber for a fiber laser 1 is shortened by ⅓, (core cross-sectional area)/(cladding cross-sectional area) is increased by approximately three times as compared to the first embodiment. Therefore, in an addition concentration of Yb approximately the same as that of the first embodiment, the absorptivity of excitation light in the entire length of the optical fiber for a fiber laser 1 can be maintained to be approximately the same. On the other hand, since the amount of heat generation per unit length of the optical fiber for a fiber laser is increased by three times, the temperature of the optical fiber for a fiber laser 1 increases considerably under the same cooling condition as the first embodiment.

Figure 9:
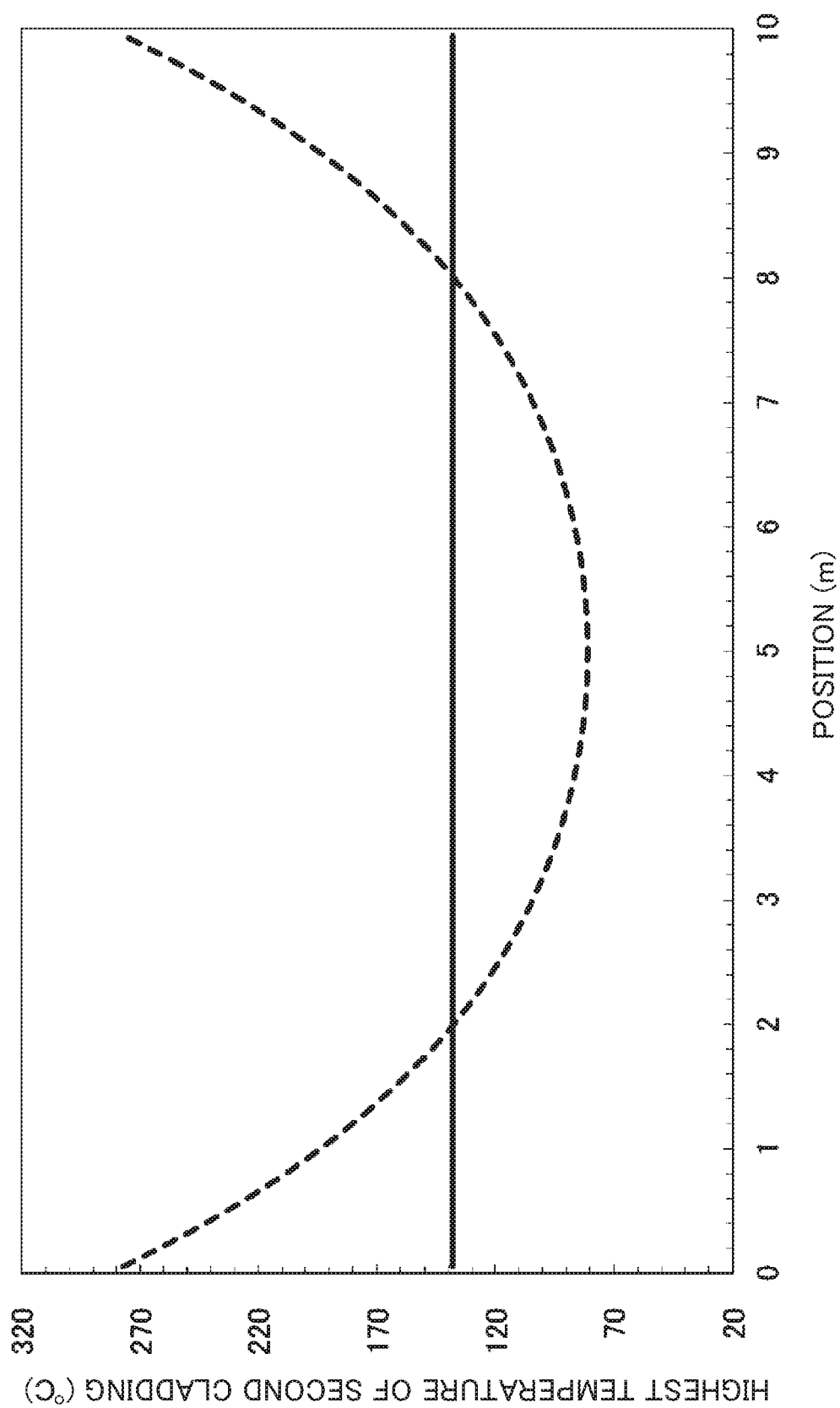
FIG. 9 is a graph illustrating a distribution example in the longitudinal direction of the optical fiber for a fiber laser, of a highest temperature of a second cladding in the optical fiber for a fiber laser according to the second embodiment of the present invention.

A solid-line graph in FIG. 9 is a graph plotting a highest temperature of the second cladding 4 in the longitudinal direction of the optical fiber for a fiber laser 1, obtained by a thermal fluid simulation. A cooling condition of the optical fiber for a fiber laser 1 in the thermal fluid simulation is as follows. Materials of the core 2 and the first cladding 3 were $SiO_2$. The second cladding 4 was a polymer (a thermal conductivity: 0.21 W/(m·K)) having an outer diameter of 600 µm. In a state in which a groove having a width of 1.5 mm and a depth of 0.75 mm was formed in a water-cooling plate (a thermal conductivity: 180 W/(m·K)) formed of an aluminum alloy cooled by a cooling water of 25° C. and the optical fiber for a fiber laser 1 is in contact with the bottom center of the groove, a thermoconductive adhesive (a thermal conductivity: 2 W/(m·K)) was flown into the groove to completely bury the groove so as to be flush with the original surface of the water-cooling plate.

As illustrated in the solid-line graph in FIG. 9, the highest temperature of the second cladding 4 of the optical fiber for a fiber laser 1 was increased by approximately 58° C. as compared to the first embodiment (the solid-line graph in FIG. 4). However, in the present embodiment, as illustrated in FIG. 7, by changing the addition concentration of Yb in the longitudinal direction of the optical fiber for a fiber laser 1, it is possible to maintain the highest temperature of the second cladding 4 to be substantially uniform in the longitudinal direction of the optical fiber for a fiber laser 1 similarly to the first embodiment. A broken-line graph in FIG. 9 illustrates the temperature when an optical fiber for a fiber laser in which Yb was added uniformly to the core in a concentration of 0.08 mole % in the longitudinal direction of the optical fiber for a fiber laser so that the absorptivity of excitation light is the same in the entire optical fiber for a fiber laser was used. In this case, it is understood the temperature at both ends to which excitation light is guided is further increased by approximately 130° C. as compared to the case of the first embodiment.

As described above, when only the addition concentration of Yb to the core 2 is changed, the refractive index of the core 2 changes, and as illustrated in Expression 2, the numerical aperture (NA) of the optical fiber for a fiber laser 1 also changes. Therefore, a problem that signal light propagating from an optical fiber having a large numerical aperture (NA) to an optical fiber having a small numerical aperture is likely to leak from the core 2 occurs. In the first embodiment, a refractive index adjustment element is added to the core 2 so that the numerical aperture (NA) is constant. In contrast, in the present embodiment, a numerical aperture adjustment element is added to the first cladding 3 so that the numerical aperture (NA) of the optical fiber for a fiber laser 1 is maintained to be constant in the longitudinal direction of the optical fiber for a fiber laser 1.

Figure 10:
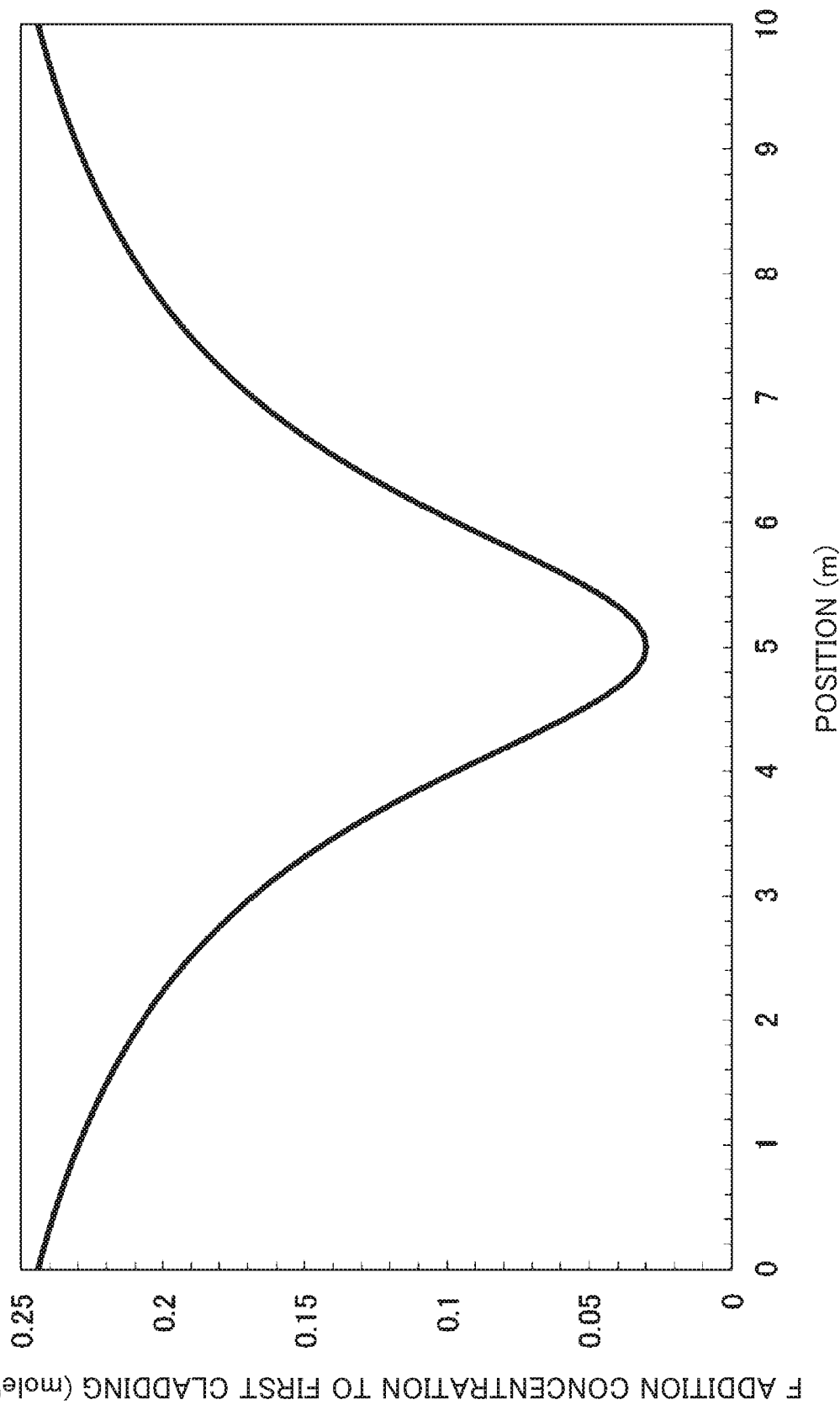
FIG. 10 is a graph illustrating a distribution example in the longitudinal direction of the optical fiber for a fiber laser, of an addition concentration of F which is a numerical aperture adjustment element to a first cladding, in the optical fiber for a fiber laser according to the second embodiment of the present invention.

FIG. 10 illustrates a distribution example of an addition concentration of F when F which decreases a refractive index when added as a numerical aperture adjustment element is added to the first cladding 3 in order to maintain the numerical aperture (NA) in the longitudinal direction of the optical fiber for a fiber laser 1 to be constant when the addition concentration of Yb to the core 2 is changed as illustrated in FIG. 7. As illustrated in FIG. 7, since the addition concentration of Yb to the core 2 is high in the vicinity of the center in the longitudinal direction of the optical fiber for a fiber laser 1, the refractive index of the core 2 increases in the vicinity of the center in the longitudinal direction of the optical fiber for a fiber laser 1. Therefore, as illustrated in FIG. 10, F for decreasing the refractive index is added to the first cladding 3 so that the concentration decreases as it approaches the vicinity of the center in the longitudinal direction of the optical fiber for a fiber laser 1. In this way, the refractive index of the first cladding 3 in the vicinity of the center in the longitudinal direction of the optical fiber for a fiber laser 1 increases as compared to a region other than the vicinity of the center. As a result, as understood from a relational expression illustrated in Expression 2 described above, the numerical aperture (NA) of the optical fiber for a fiber laser 1 can be maintained to be constant in the longitudinal direction of the optical fiber for a fiber laser 1.

Figure 11:
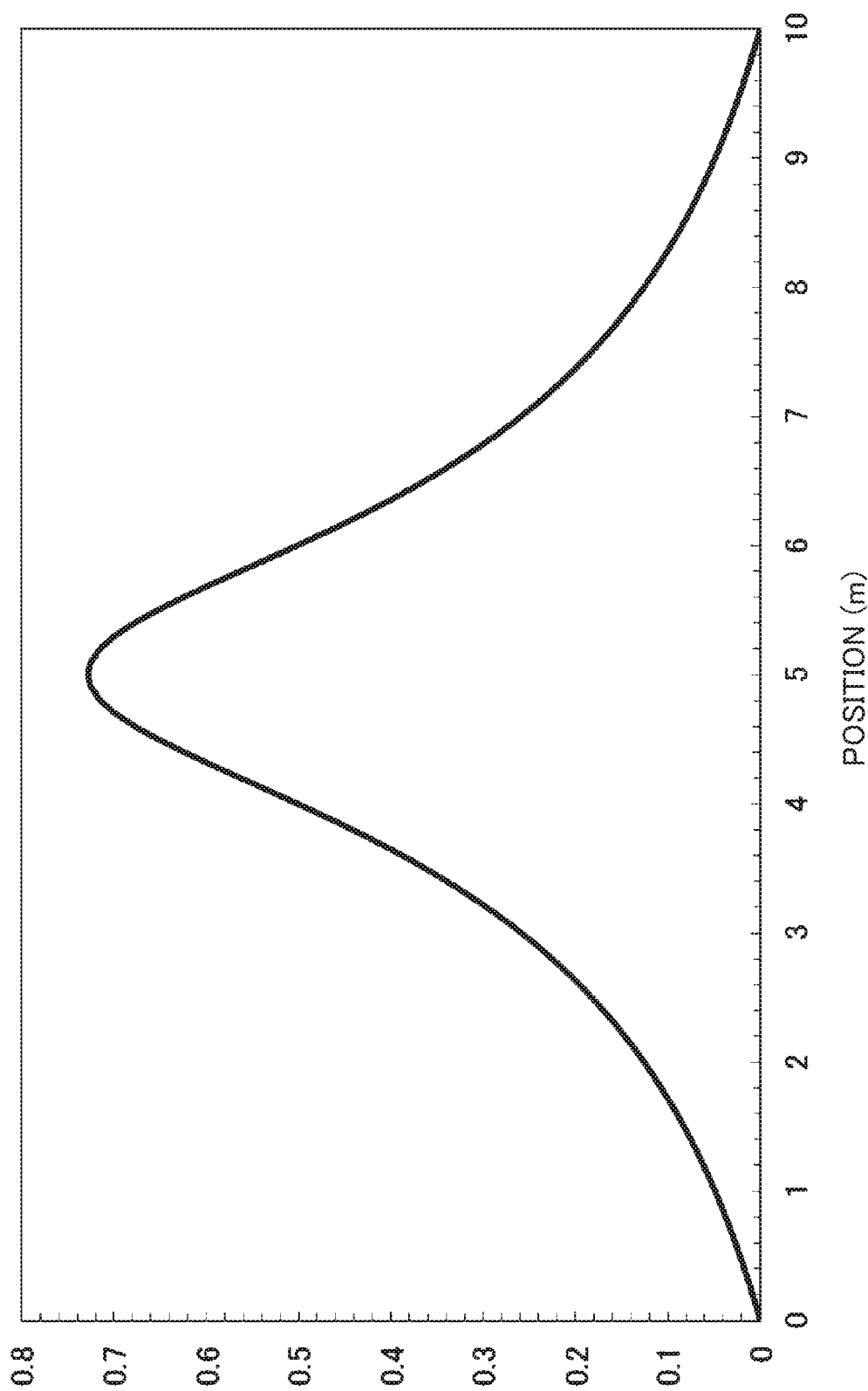
FIG. 11 is a graph illustrating a distribution example in the longitudinal direction of the optical fiber for a fiber laser, of an addition concentration of Ge which is a numerical aperture adjustment element to a first cladding, in the optical fiber for a fiber laser according to the second embodiment of the present invention.

In order to cancel the change in the refractive index of the core 2 resulting from the change in the addition concentration of Yb to the core 2, an element that increases the refractive index when added as a numerical aperture adjustment element to be added to the first cladding 3 may be used. FIG. 11 illustrates a distribution example of an addition concentration to the first cladding 3, of Ge that increases the refractive index when added as a numerical aperture adjustment element in order to maintain the numerical aperture (NA) in the longitudinal direction of the optical fiber for a fiber laser 1 to be constant when the addition concentration of Yb to the core 2 is changed as illustrated in FIG. 7. As illustrated in FIG. 11, Ge for increasing the refractive index is added to the first cladding 3 so that the concentration increases as it approaches the vicinity of the center in the longitudinal direction of the optical fiber for a fiber laser 1.

Figure 12:
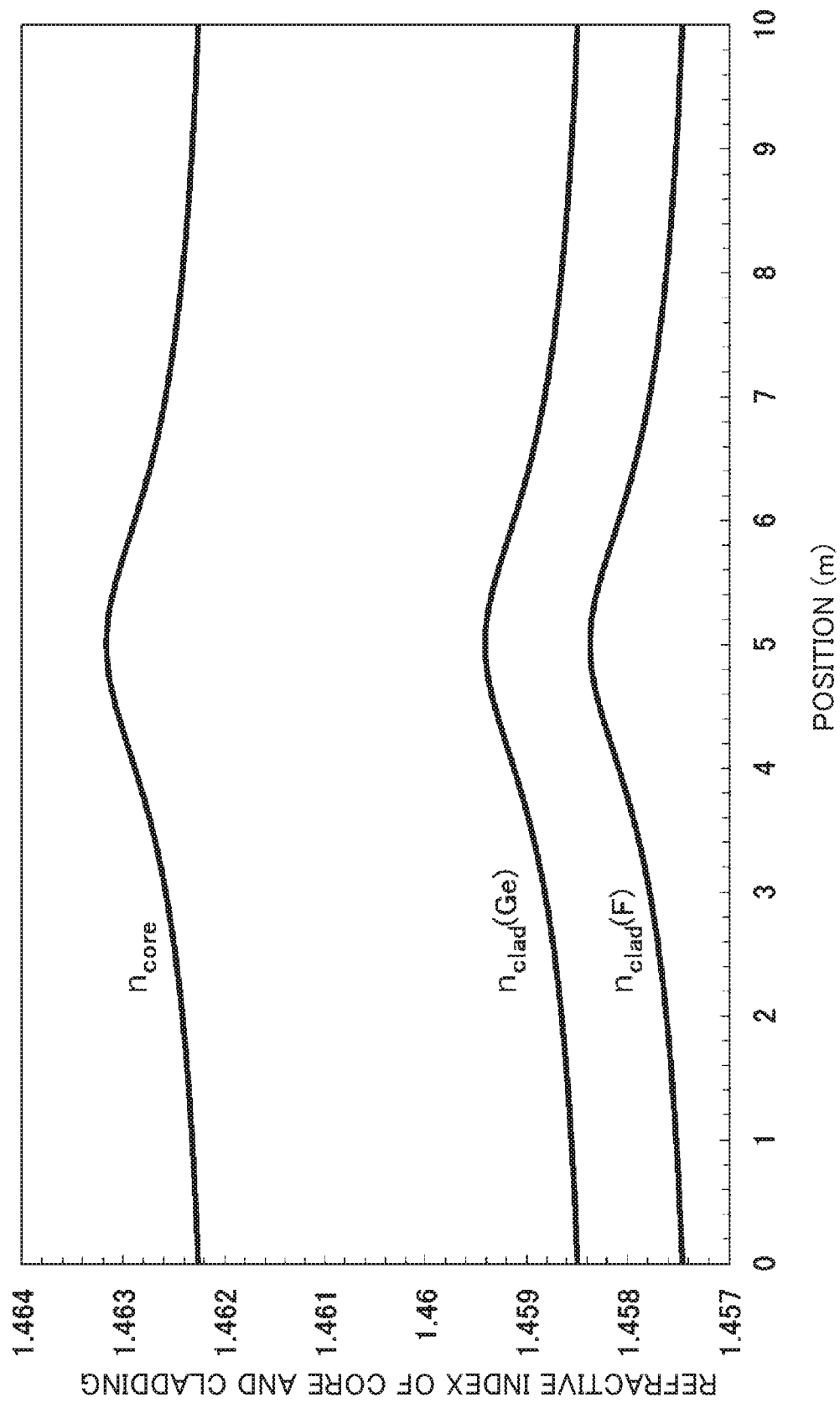
FIG. 12 is a graph illustrating a distribution example in the longitudinal direction of the optical fiber for a fiber laser, of a refractive index of a core to which Yb is added, a refractive index of a first cladding to which F is added as a numerical aperture adjustment element, and a refractive index of a first cladding to which Ge is added as a numerical aperture adjustment element, in the optical fiber for a fiber laser according to the second embodiment of the present invention.

FIG. 12 illustrates a distribution example in the longitudinal direction of the optical fiber for a fiber laser 1, of the refractive index ($n_{core}$) of the core 2 when Yb is added to the core 2 in the concentration distribution illustrated in FIG. 7, the refractive index ($n_{clad}(F)$) of the first cladding 3 when F is added to the first cladding 3 in the concentration distribution illustrated in FIG. 10, and the refractive index ($n_{clad}(Ge)$) of the first cladding 3 when Ge is added to the first cladding 3 in the concentration distribution illustrated in FIG. 11. When this value is substituted into Expression 2, the numerical aperture (NA) in the longitudinal direction of the optical fiber for a fiber laser 1 is constant.

According to the optical fiber for a fiber laser 1 of the second embodiment, since a numerical aperture adjustment element is added to the first cladding 3, it is possible to suppress the change in the numerical aperture (NA) in the longitudinal direction of the optical fiber for a fiber laser 1 and to suppress the leakage of signal light from the core 2 without adding an element which may decrease the transmittance of the core 2 when added to the core 2.

Third Embodiment

Figure 13:
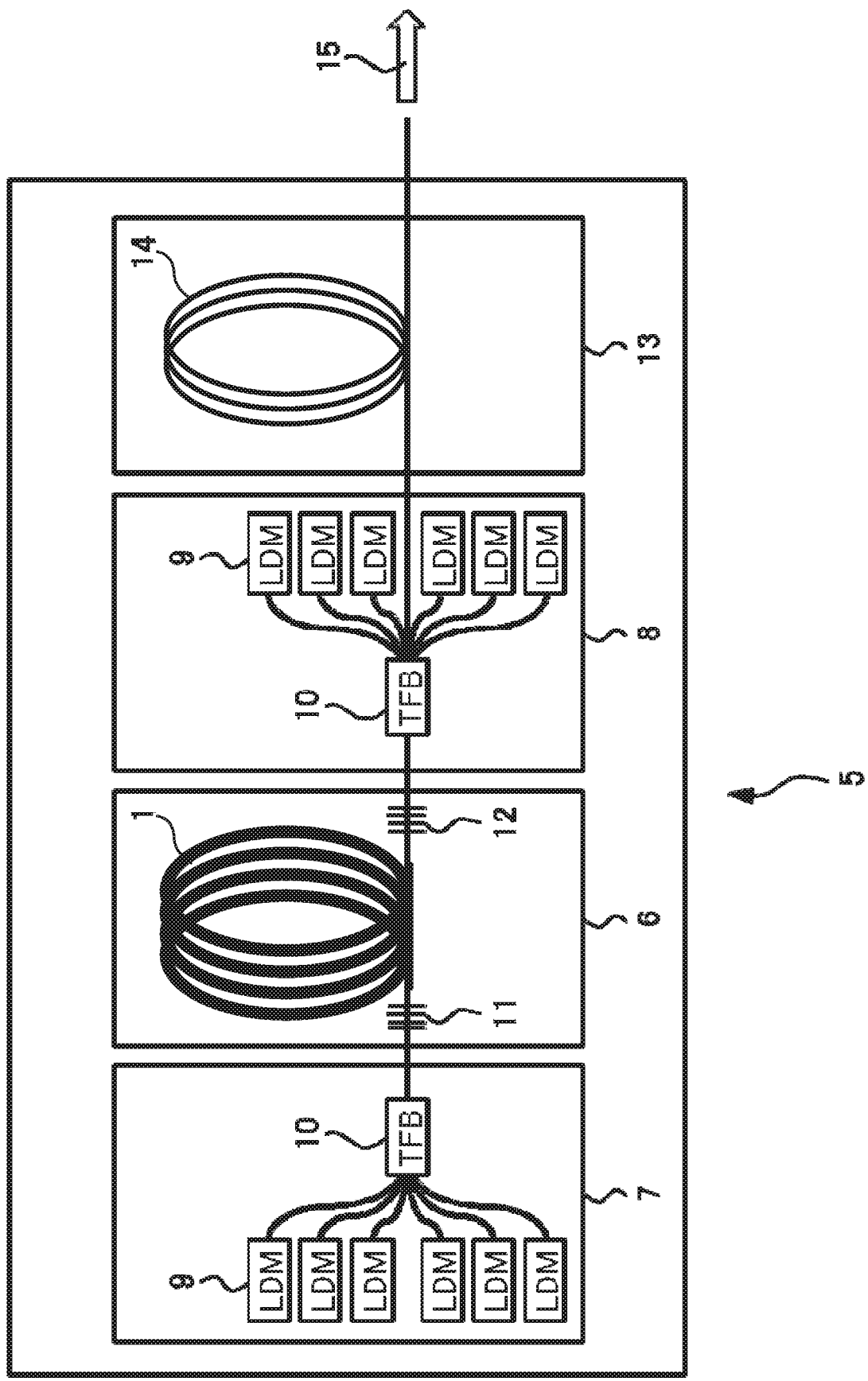
FIG. 13 is a schematic diagram illustrating a fiber laser according to a third embodiment of the present invention.

FIG. 13 is a schematic diagram of a fiber laser according to a third embodiment of the present invention. The fiber laser 5 of the present embodiment includes a front excitation unit 7, an oscillator unit 6, a rear excitation unit 8, and a beam delivery unit 13 and is configured so that a laser beam 15 is emitted from the beam delivery unit 13. A detailed structure of the optical fiber for a fiber laser 1 is not illustrated in order to simplify the drawing. The optical fiber for a fiber laser 1 is illustrated by a bold solid line, and the other optical fibers are illustrated by a narrower solid line. A part disposed in a loop form in the oscillator unit 6 is the optical fiber for a fiber laser 1.

A plurality of laser diode modules (LDMs) is disposed in each of the front excitation unit 7 and the rear excitation unit 8. Excitation light emitted from the plurality of LDMs 9 is introduced to the first cladding 3 (see FIGS. 1A and 1B) of the optical fiber for a fiber laser 1 functioning as an amplification optical fiber via a tapered fiber bundle (TFB) 10 called an excitation light combiner. In this structure, the excitation light introduced to the first cladding 3 is gradually absorbed in the core 2 (see FIGS. 1A and 1B) to which Yb is added while propagating through the first cladding 3.

A high reflector-fiber Bragg grating (HRFBG) 11 and an output coupler-fiber Bragg grating (OCFBG) 12 capable of reflecting light of a specific wavelength by forming a diffraction grating in the core 2 are provided on both sides of the optical fiber for a fiber laser 1, and these gratings form a laser resonator together with the optical fiber for a fiber laser 1. A laser beam emitted from an outlet of the OCFBG 12 of the oscillator unit 6 is delivered to a machining head (not illustrated) or the like by the delivery fiber 14 disposed in the beam delivery unit 13 via a laser optical system (not illustrated) provided as necessary and is used for laser machining.

Although not illustrated in the drawing, it is preferable to provide a photodetection unit such as a photodiode in the laser optical system or the like in order to detect the amount of a laser beam emitted from the oscillator unit 6 and the amount of returning light propagating through the laser optical system in an opposite direction to the direction of the laser beam emitted from the oscillator unit 6. In FIG. 13, a power supply unit that supplies electricity to the LDM 9 and a control unit for controlling the respective units of the fiber laser 5 are not illustrated.

The optical fiber for a fiber laser 1 of the first embodiment or the optical fiber for a fiber laser 1 of the second embodiment in which the addition concentration distribution of Yb to the core 2 is controlled in the longitudinal direction of the optical fiber for a fiber laser so that the temperature of the optical fiber for a fiber laser during rated optical output or maximum optical output is uniform in the longitudinal direction of the optical fiber for a fiber laser is used as the optical fiber for a fiber laser 1 of the fiber laser 5 in FIG. 13. In this way, it is possible to decrease an absorption coefficient or an absorption loss of excitation light to the core 2 in the vicinity of an excitation light guiding end in which an operation limit is likely to be reached due to the increase in temperature since the amount of absorption of excitation light to the core 2 is generally large and the amount of heat generation per unit length resulting from the absorption increases. Moreover, as illustrated in FIGS. 4 and 9, the temperature in the longitudinal direction of the optical fiber for a fiber laser 1 can be made uniform. As a result, the output of the fiber laser 5 can be increased rather than the case where the temperature in the longitudinal direction of the optical fiber for a fiber laser 1 is not uniform, and a fiber laser having high reliability in a high output state can be realized.

When the optical fiber for a fiber laser 1 of the first embodiment is used, since a refractive index adjustment element is added to the core 2 so that the change in the refractive index of the core 2 which can occur due to the change in the addition concentration of Yb to the core 2 is cancelled and the refractive index of the core 2 is maintained to be constant in the longitudinal direction of the optical fiber for a fiber laser 1, it is possible to suppress the change in the refractive index of the core 2 occurring due to the change in the addition concentration of Yb. Therefore, the change in the numerical aperture (NA) of the optical fiber for a fiber laser 1 is suppressed, and the leakage of signal light from the core 2 can be suppressed.

When the optical fiber for a fiber laser 1 of the second embodiment is used, a numerical aperture adjustment element is added to the first cladding 3 so that the numerical aperture (NA) of the optical fiber for a fiber laser 1 is maintained to be constant in the longitudinal direction of the optical fiber for a fiber laser 1 by changing the refractive index of the first cladding 3 according to the change in the numerical aperture (NA) of the optical fiber for a fiber laser 1 which can occur due to the change in the refractive index of the core 2 occurring due to the change in the addition concentration of Yb to the core 2. Therefore, it is possible to suppress the change in the numerical aperture (NA) of the optical fiber for a fiber laser 1 and to suppress the leakage of signal light from the core 2 without adding an element which can decrease the transmittance of the core 2 to the core 2.

Fourth Embodiment

Figure 14:
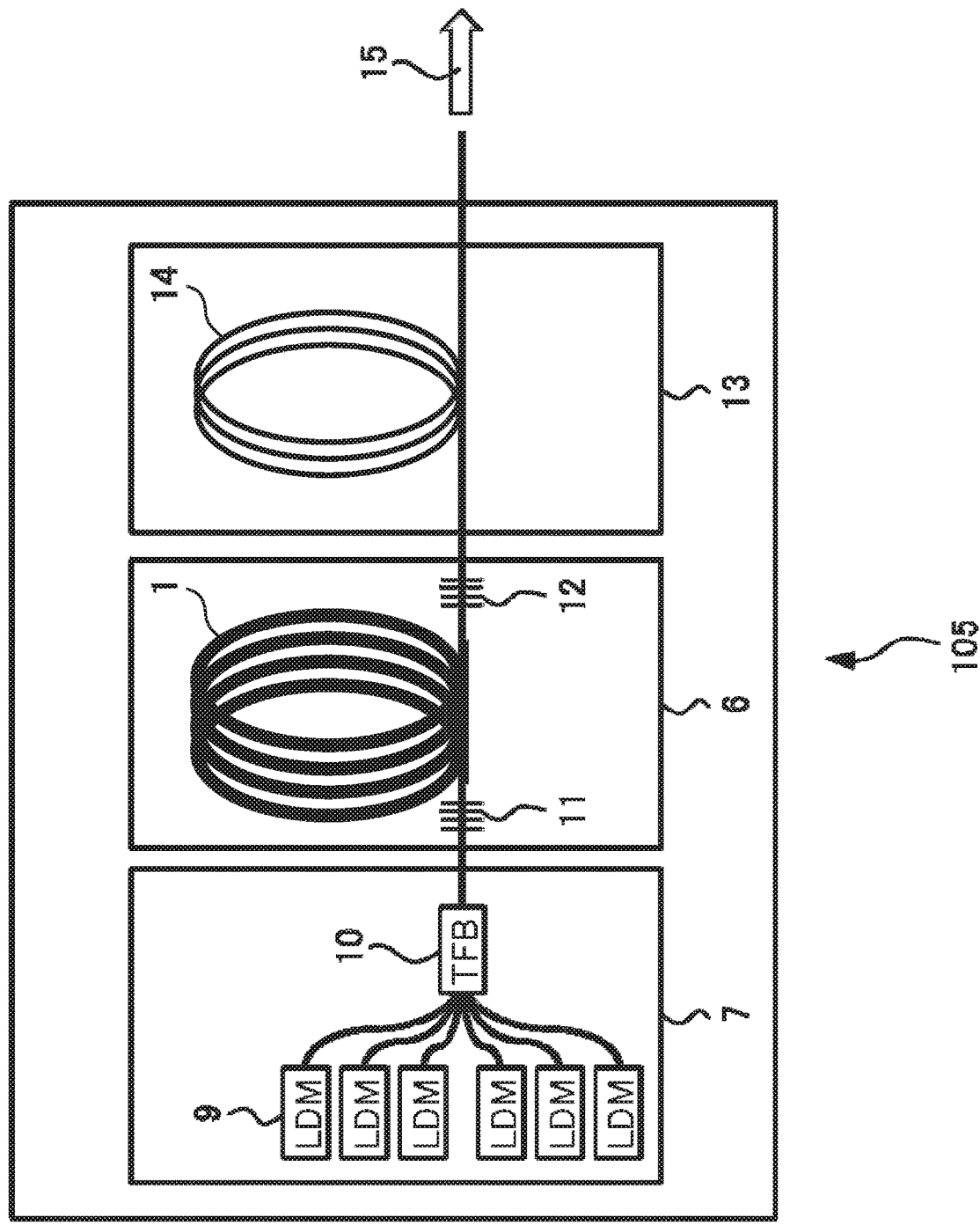
FIG. 14 is a schematic diagram illustrating a fiber laser according to a fourth embodiment of the present invention.

FIG. 14 is a schematic diagram of a fiber laser according to a fourth embodiment of the present invention. Similarly to FIG. 13, a detailed structure of the optical fiber for a fiber laser 1 is not illustrated in order to simplify the drawing. The optical fiber for a fiber laser 1 is illustrated by a bold solid line, and the other optical fibers are illustrated by a narrower solid line. A power supply unit and a control unit are not illustrated similarly to FIG. 13.

A fiber laser 105 illustrated in FIG. 14 is different from the fiber laser 5 illustrated in FIG. 13 in that a rear excitation unit is not provided but the front excitation unit 7 only is provided. That is, the fiber laser 105 of the present embodiment is a fiber laser that guides excitation light to the first cladding 3 from one direction only. The optical fiber for a fiber laser 1 in which the addition concentration distribution of Yb to the core 2 (see FIGS. 1A and 1B) is controlled in the longitudinal direction of the optical fiber for a fiber laser 1 is used as an optical fiber for a fiber laser of the fiber laser 105. The addition concentration distribution of Yb to the core 2 is controlled so that the temperature in the longitudinal direction of the optical fiber for a fiber laser 1 during rated optical output or maximum optical output is constant in at least a most length portion from the end that guides excitation light among the entire length of the optical fiber for a fiber laser 1 and is lower than the constant temperature in the remaining length portion. The most length portion from the end that guides excitation light is a length portion of at least 50% or more, and preferably 80% or more, from the end that guides excitation light. However, a length portion in which the temperature in the longitudinal direction of the optical fiber for a fiber laser 1 is constant is shorter than the entire length of the optical fiber for a fiber laser 1.

Figure 15:
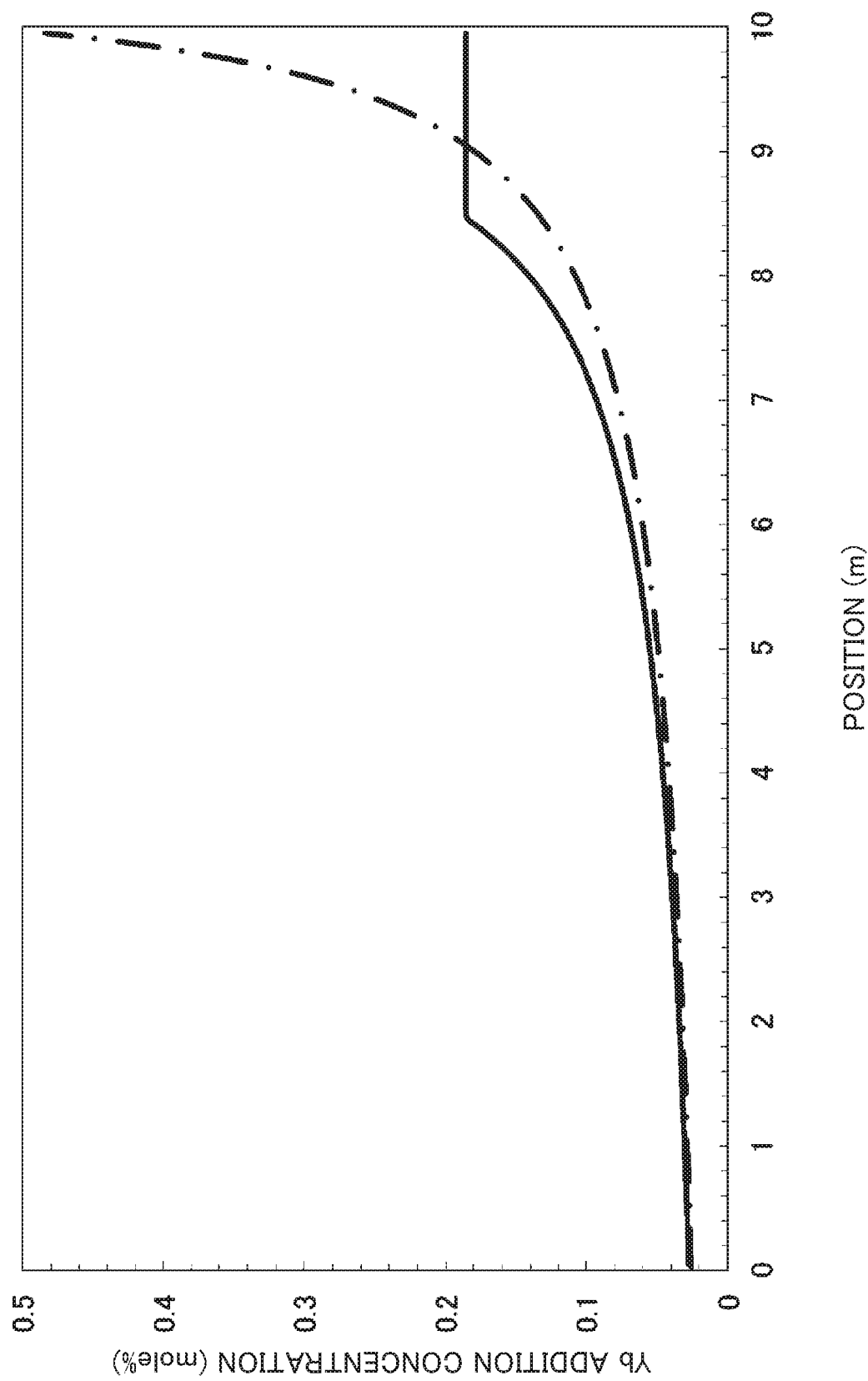
FIG. 15 is a graph illustrating a distribution example in a longitudinal direction of an optical fiber for a fiber laser, of a Yb addition concentration in an optical fiber for a fiber laser used in the fiber laser according to the fourth embodiment of the present invention.

FIG. 15 illustrates a distribution example in the longitudinal direction of the optical fiber for a fiber laser 1, of an addition concentration of Yb to the core 2. A solid-line graph in FIG. 15 illustrates a distribution example of an addition concentration of Yb to the core 2 in the optical fiber for a fiber laser 1 used in the fiber laser 105 of the present embodiment. As illustrated in the solid-line graph in FIG. 15, the addition concentration of Yb to the core 2 is low on an end side that guides excitation light and increases gradually as it departs from the end that guides excitation light. On the other hand, the addition concentration is substantially constant in the vicinity of an end on the opposite side of the end that guides excitation light.

Figure 16:
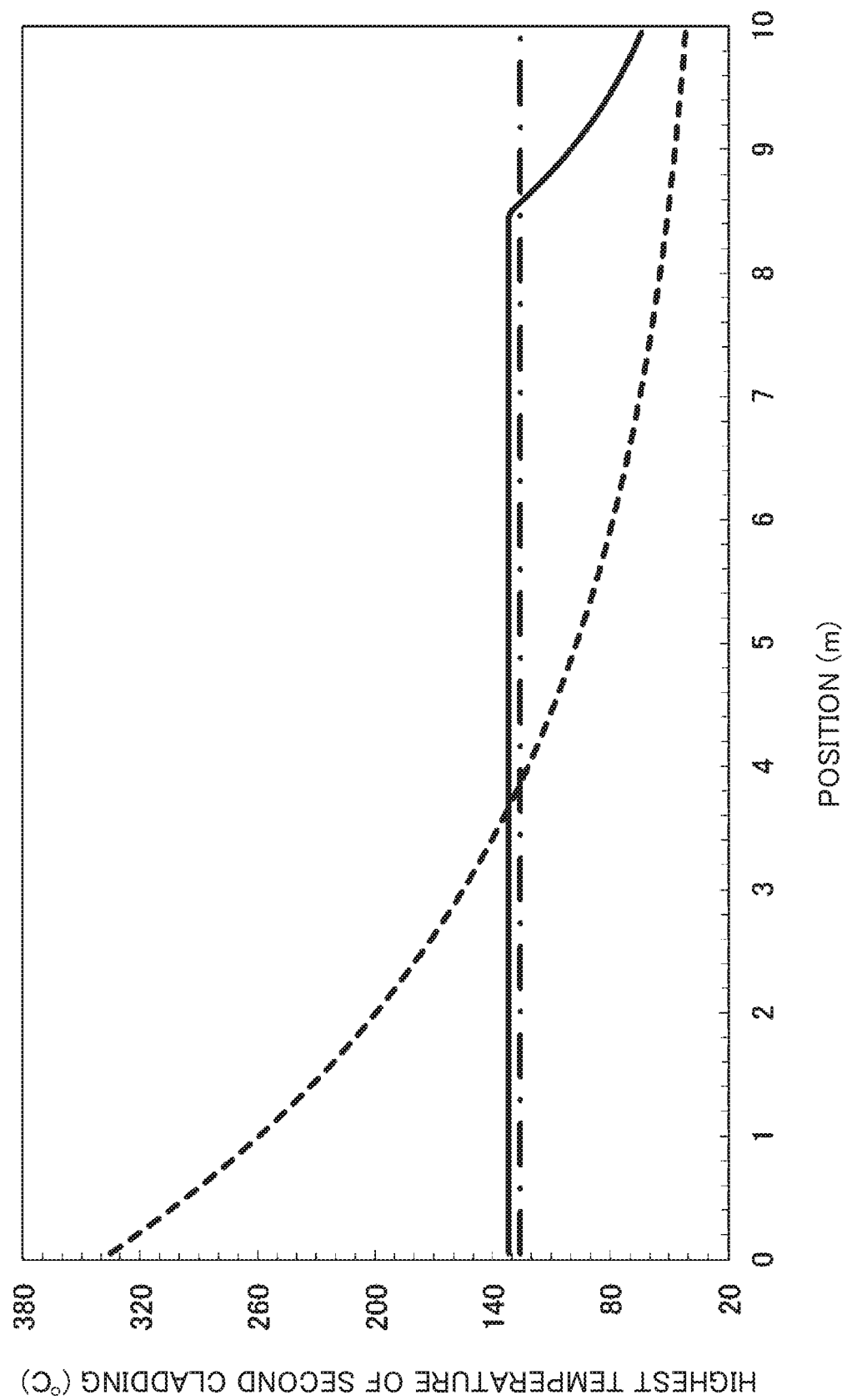
FIG. 16 is a graph illustrating a distribution example in the longitudinal direction of the optical fiber for a fiber laser, of a highest temperature of a second cladding in the optical fiber for a fiber laser used in the fiber laser according to the fourth embodiment of the present invention.

A solid-line graph in FIG. 16 is a graph plotting a highest temperature of the second cladding 4 (see FIGS. 1A and 1B) in the longitudinal direction of the optical fiber for a fiber laser 1, obtained by performing thermal fluid simulation on the optical fiber for a fiber laser 1 of the fiber laser 105 illustrated in FIG. 14 which uses the optical fiber for a fiber laser 1 in which the addition concentration of Yb to the core 2 is controlled as illustrated in the solid-line graph in FIG. 15.

The condition of the thermal fluid simulation was such that the core diameter of the optical fiber for a fiber laser 1 was 35 μm, the first cladding diameter was 250 μm, the second cladding diameter was 650 μm, and excitation light of 6.6 kW was guided from one end of the optical fiber for a fiber laser 1. Moreover, a cooling condition of the optical fiber for a fiber laser 1 is as follows. Materials of the core 2 and the first cladding 3 were $SiO_2$. The second cladding 4 was a polymer (a thermal conductivity: 0.21 W/(m·K)). In a state in which a groove having a width of 1.5 mm and a depth of 0.75 mm was formed in a water-cooling plate (a thermal conductivity: 180 W/(m·K)) formed of an aluminum alloy cooled by a cooling water of 25° C. and the optical fiber for a fiber laser 1 is in contact with the bottom center of the groove, a thermoconductive adhesive (a thermal conductivity: 2 W/(m·K)) was flown into the groove to completely bury the groove so as to be flush with the original surface of the water-cooling plate.

As illustrated in the solid-line graph in FIG. 16, although the temperature of the optical fiber for a fiber laser 1 in which the addition concentration of Yb to the core 2 is controlled as in the solid-line graph in FIG. 15 is constant in a length portion of approximately 80% from the end that guides excitation light, the temperature in the remaining length portion (a portion in the vicinity of an end on the opposite side of the end that guides excitation light) is lower than the constant temperature.

A one-dot-chain-line graph in FIG. 15 illustrates a distribution example of an addition concentration of Yb added to a core when the temperature in the longitudinal direction of the optical fiber for a fiber laser is made uniform over the entire length of the optical fiber for a fiber laser during rated optical output or maximum optical output. In this case, the addition concentration of Yb to the core is very high at an end on the opposite side of the end that guides excitation light.

A one-dot-chain-line graph in FIG. 16 illustrates a distribution example of a highest temperature of the second cladding when an optical fiber for a fiber laser having such an addition concentration distribution of Yb as the one-dot-chain-line graph in FIG. 15 was used. When Yb is added to the core as in the one-dot-chain-line graph in FIG. 15, the temperature of the optical fiber for a fiber laser is uniform over the entire length of the optical fiber for a fiber laser.

A broken-line graph in FIG. 16 illustrates a distribution example of a highest temperature of the second cladding when an optical fiber for a fiber laser to which Yb was added to the core uniformly in the longitudinal direction of the optical fiber for a fiber laser in a concentration of 0.08 mole % so that the absorptivity is the same in the entire optical fiber for a fiber laser was used When Yb is added uniformly in the longitudinal direction of the optical fiber for a fiber laser, the temperature of the optical fiber for a fiber laser is very high as it approaches the end which guides excitation light.

Front-side excitation as in the present embodiment provides a merit that excitation efficiency can be enhanced as compared to both-side excitation as in the third embodiment. However, as is clear from FIGS. 15 and 16, when excitation light is guided to the first cladding from one end of the optical fiber for a fiber laser, if the temperature of the optical fiber for a fiber laser is to be made uniform over the entire length of the optical fiber for a fiber laser, it is necessary to add a very high concentration of Yb to the core in a portion close to the opposite side of the end that guides excitation light. In this case, deterioration resulting from photodarkening may occur. However, when the temperature of a portion close to the opposite side of an end that guides excitation light is decreased slightly in the solid-line graph in FIG. 16, the highest temperature of the second cladding increases just slightly as compared to a case in which the same temperature is maintained over the entire length of the optical fiber for a fiber laser while suppressing the highest addition concentration of Yb to be low, and an absorptivity of excitation light equivalent to that when the same temperature is maintained over the entire length of the optical fiber for a fiber laser is obtained.

Fifth Embodiment

Figure 17:
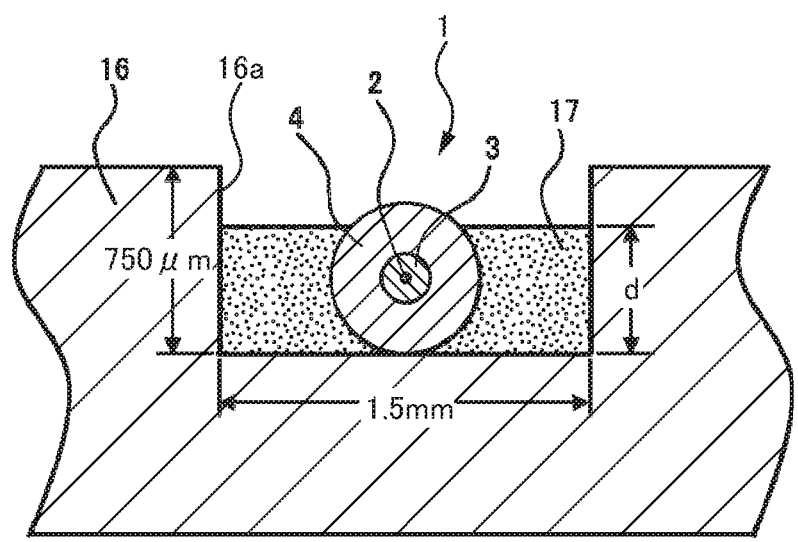
FIG. 17 is a schematic diagram illustrating a cooling structure of an optical fiber for a fiber laser used a fiber laser according to a fifth embodiment of the present invention.
Figure 19:
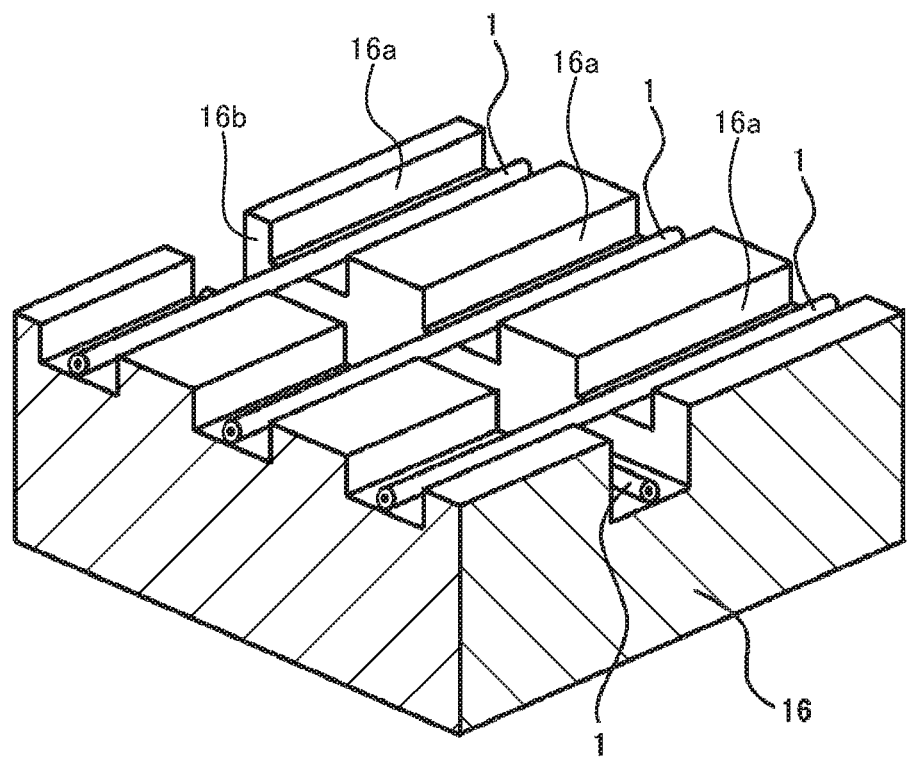
FIG. 19 is a schematic diagram illustrating another example of a cooling structure of the optical fiber for a fiber laser used in the fiber laser according to the fifth embodiment of the present invention.
Figure 20:
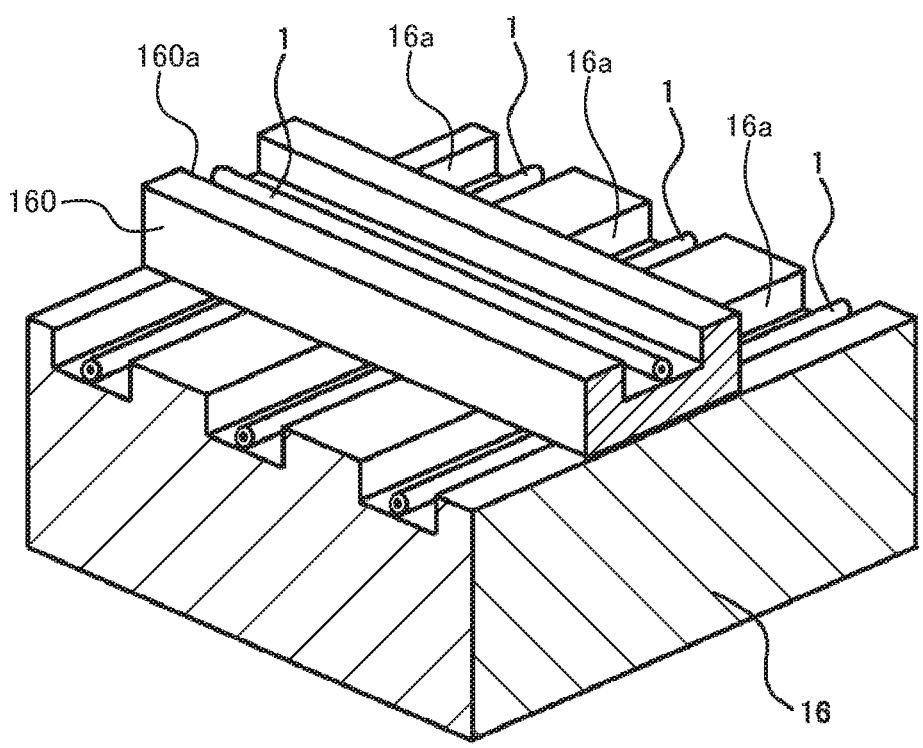
FIG. 20 is a schematic diagram illustrating still another example of a cooling structure of the optical fiber for a fiber laser used in the fiber laser according to the fifth embodiment of the present invention.

FIGS. 17, 19, and 20 are schematic diagrams illustrating a cooling structure of an optical fiber for a fiber laser in a fiber laser according to a fifth embodiment of the present invention. The cooling structure (a heat radiation structure) can be used in the fiber lasers 5 and 105 of the third and fourth embodiments. FIG. 17 is a cross-sectional view illustrating a portion of a cooling structure of an optical fiber for a fiber laser. As illustrated in FIG. 17, at least a portion of the optical fiber for a fiber laser 1 is provided in a groove 16a formed in a cooling plate 16.

In this example, the core diameter of the optical fiber for a fiber laser 1 is 35 μm, the first cladding diameter is 200 μm, and the second cladding diameter is 600 μm. The core 2 and the first cladding 3 are $SiO_2$. The second cladding 4 is a polymer (a thermal conductivity: 0.21 W/(m·K)). The cooling plate 16 is a water-cooling plate (a thermal conductivity: 180 W/(m·K)) formed of an aluminum alloy cooled by a cooling water of 25° C.

The groove 16a having a width of 1.5 mm and a depth of 0.75 mm is formed in the surface of the cooling plate 16 illustrated in FIG. 17. The optical fiber for a fiber laser 1 is provided by being fixed by a thermoconductive adhesive (a thermal conductivity: 2 W/(m·K)) 17 filled in the groove 16a in a state of being in contact with the bottom center of the groove 16a on the surface of the cooling plate 16. The thickness of the thermoconductive adhesive 17 in the groove 16a is d μm. A thermoconductive paste having a similar thermal conductivity may be used instead of the thermoconductive adhesive 17.

Figure 18:
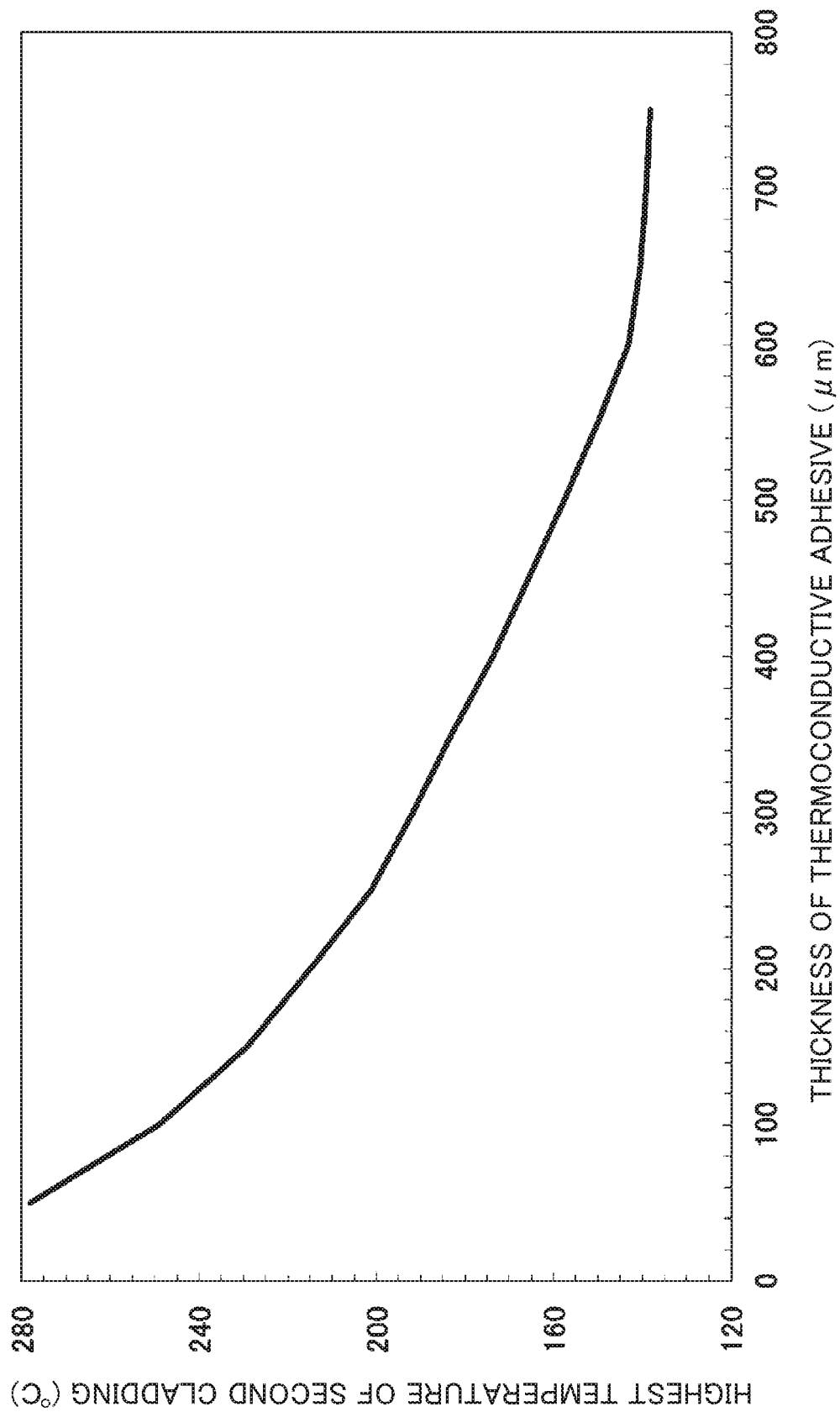
FIG. 18 is a graph illustrating a relation between a highest temperature of a second cladding and a thickness of a thermoconductive adhesive in the cooling structure illustrated in FIG. 17.

In this state, thermal fluid simulation was performed assuming that the core 2 generates a heat of 125 W per meter, and the thickness (d) dependence of the thermoconductive adhesive 17, of the highest temperature of the second cladding 4 was calculated. The results are illustrated in FIG. 18. As understood from FIG. 18, if the thickness d of the thermoconductive adhesive 17 is smaller than a thickness (d≥600 μm) in which the optical fiber for a fiber laser 1 is completely buried in the thermoconductive adhesive 17, the highest temperature of the second cladding 4 increases abruptly with decrease in the thickness d of the thermoconductive adhesive 17. In contrast, if the thickness d of the thermoconductive adhesive 17 is larger than 600 μm, the thickness dependence of the thermoconductive adhesive 17 of the highest temperature of the second cladding 4 is gentle.

Therefore, it is desirable that the optical fiber for a fiber laser 1 is provided to be in contact with the bottom of the groove 16a and so as not to be exposed completely with the aid of the thermoconductive adhesive 17 or a thermoconductive paste, in the groove 16a that is deeper than at least the outer diameter of the optical fiber for a fiber laser 1, formed in the cooling plate 16 formed of a thermoconductive member such as an aluminum alloy so that a cooling condition of the optical fiber for a fiber laser 1 is improved and an increase in the temperature of the optical fiber for a fiber laser 1 can be suppressed more efficiently. In this way, the cooling condition of the optical fiber for a fiber laser 1 is improved, and an increase in temperature of the optical fiber for a fiber laser 1 can be suppressed more efficiently.

However, since the optical fiber for a fiber laser 1 is long, in order to reduce the size of a fiber laser, it is necessary to wind the optical fiber for a fiber laser 1 in multiple turns in a loop form as illustrated in FIGS. 13 and 14 and provide the same in the cooling plate 16. Therefore, portions where the optical fibers for a fiber laser 1 cross each other may occur, and it may be difficult to adopt such a cooling structure as illustrated in FIG. 17 over the entire length of the optical fiber for a fiber laser 1. In such a case, a cooling structure illustrated in FIG. 19 or 20 may be employed in portions where the optical fibers for a fiber laser 1 cross each other.

A cooling structure illustrated in FIG. 19 uses a cooling plate 16 in which grooves 16b deeper than the grooves 16a, extending in a direction crossing the grooves 16a are formed in the surface thereof in addition to the grooves 16a extending in one direction. The deep grooves 16b are disposed so as to divide the shallow grooves 16a. In this manner, when the cooling plate 16 in which the grooves 16a and 16b disposed so as to cross each other have different depths is used, one of the crossing optical fibers for a fiber laser 1 is disposed in the grooves 16a, and the other is disposed in the grooves 16b, it is possible to perform cooling in a state in which the crossing optical fibers for a fiber laser 1 do not make contact with each other.

A cooling structure illustrated in FIG. 20 has a bridge 160 that is provided on an upper surface of the cooling plate 16 having the grooves 16a extending in one direction so as to extend over the grooves 16a in a direction crossing the grooves 16a. The bridge 160 is formed of the same thermoconductive member as the cooling plate 16. A groove 160a is formed in the upper surface of the bridge 160 so as to extend in a direction crossing the grooves 16a. In this manner, when the cooling plate 16 in which the bridge 160 having the groove 160a extending in the direction crossing the grooves 16a is provided above the grooves 16a is used, one of the crossing optical fibers for a fiber laser 1 is provided in the grooves 16a, and the other is provided in the groove 160a, it is possible to perform cooling in a state in which the crossing optical fibers for a fiber laser 1 do not make contact with each other.

FIGS. 19 and 20 illustrate the cooling structure of the optical fiber for a fiber laser 1 in a state in which a portion where the optical fibers for a fiber laser 1 cross each other is cut away. Moreover, the thermoconductive adhesive 17 and the thermoconductive paste are not illustrated so that the optical fiber for a fiber laser 1 is visible.

By employing such a cooling structure as illustrated in FIG. 19 or 20, it is possible to perform cooling so that the optical fibers for a fiber laser 1 do not make contact with each other in a portion where the optical fibers for a fiber laser 1 cross each other. That is, the cooling plate 16 can cool a portion of the optical fiber for a fiber laser 1 disposed so that the other optical fiber for a fiber laser 1 is disposed between the optical fiber for a fiber laser 1 and the cooling plate 16 so as to cross the optical fiber for a fiber laser 1 among portions where the optical fibers for a fiber laser 1 cross each other. In this way, it is possible to shorten or completely eliminate the range of the optical fiber for a fiber laser 1 in which a cooling condition is not satisfactory and the temperature is higher than the other portion since the optical fiber for a fiber laser 1 is not in contact with the cooling plate or the optical fiber for a fiber laser 1 is not provided in the groove and is not completely covered by a thermoconductive adhesive or a thermoconductive paste.

Sixth Embodiment

Figure 21:
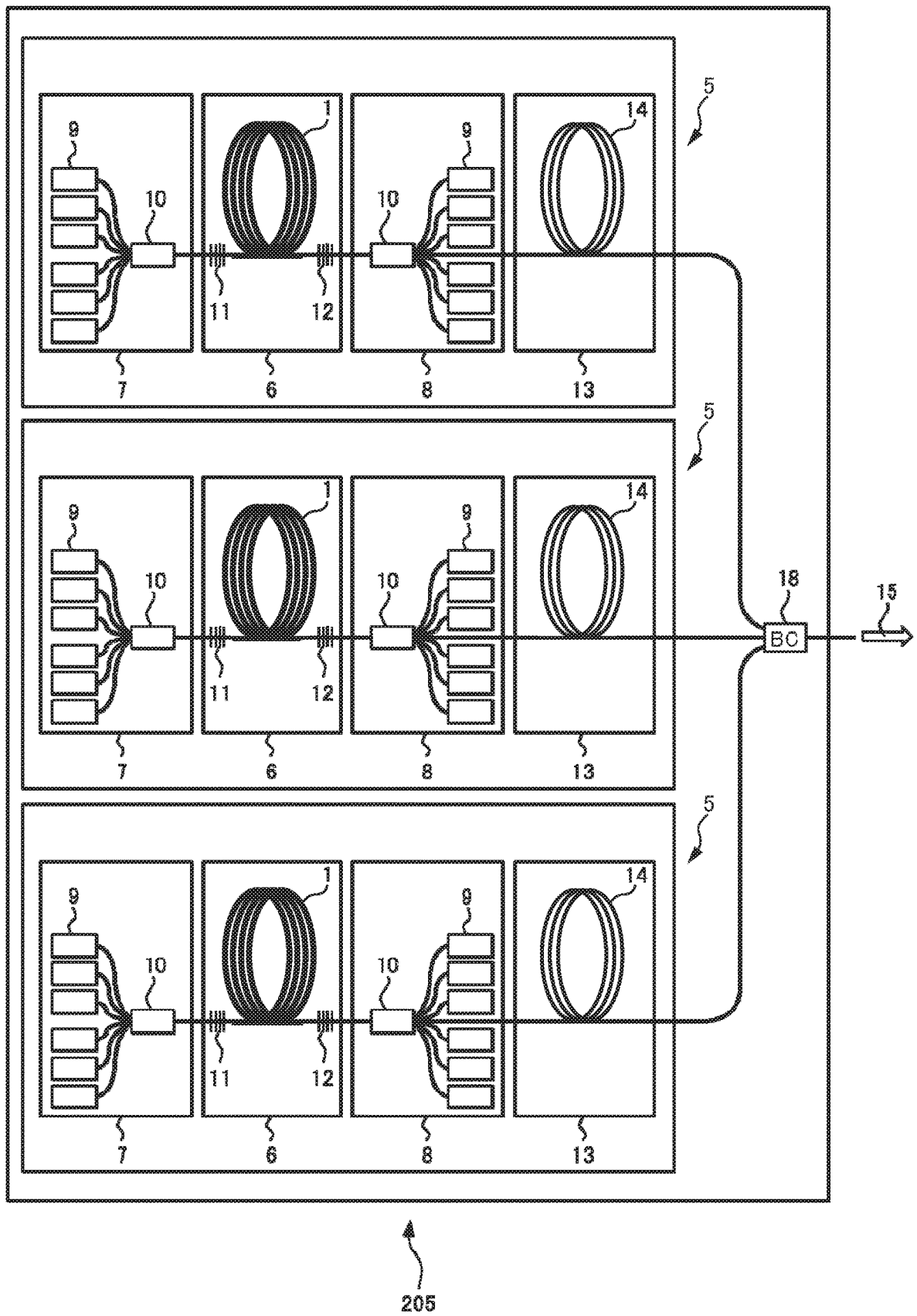
FIG. 21 is a schematic diagram illustrating a fiber laser according to a sixth embodiment of the present invention.

FIG. 21 is a schematic diagram of a fiber laser according to a sixth embodiment of the present invention. A fiber laser 205 of the present embodiment includes a plurality of fiber lasers 5 of the third embodiment and further includes a beam combiner 18 that couples the laser outputs from the fiber lasers 5 to one optical fiber. The fiber laser 5 of the third embodiment has the optical fiber for a fiber laser 1 in which the temperature is made uniform in the longitudinal direction as described above and can emit a high-power laser beam. Therefore, the fiber laser 205 of the present embodiment can emit a higher-power laser beam 15 by coupling the optical outputs of the fiber lasers 5 using one beam combiner 18.

In the present embodiment, although the fiber laser 205 having three fiber lasers 5 is illustrated, the number of fiber lasers 5 that form the fiber laser 205 may be two and may be three or more. The fiber laser 205 of the present embodiment may include a plurality of such front-side excitation (single-side excitation) fiber lasers 105 as in the fourth embodiment instead of such both-side excitation fiber lasers 5 as in the third embodiment and may couple the optical outputs from the fiber lasers 105 using one beam combiner 18.

Seventh Embodiment

FIGS. 22A to 22G are schematic diagrams of production steps for describing a production method for the optical fiber for a fiber laser 1 according to the present invention. A production method of the present embodiment illustrates an example of a production method for producing the optical fiber for a fiber laser 1 in which the addition concentration of Yb to the core 2 and the addition concentration of a refractive index adjustment element are changed in the longitudinal direction as in the optical fiber for a fiber laser 1 of the first embodiment.

Figure 22A:
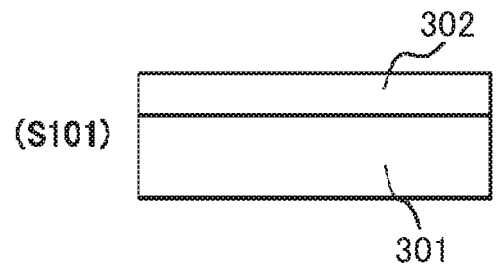
FIG. 22A is a schematic diagram of production steps for describing a production method for an optical fiber for a fiber laser according to a seventh embodiment of the present invention.
Figure 22B:
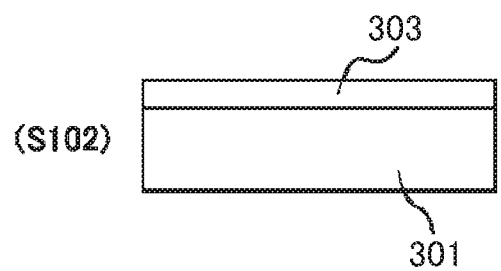
FIG. 22B is a schematic diagram of production steps for describing a production method for an optical fiber for a fiber laser according to the seventh embodiment of the present invention.
Figure 22C:
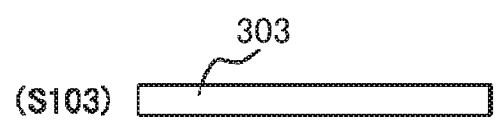
FIG. 22C is a schematic diagram of production steps for describing a production method for an optical fiber for a fiber laser according to the seventh embodiment of the present invention.
Figure 22D:
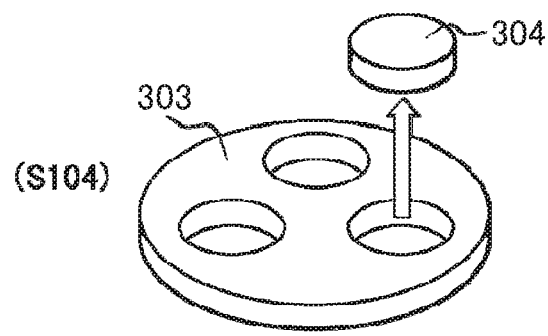
FIG. 22D is a schematic diagram of production steps for describing a production method for an optical fiber for a fiber laser according to the seventh embodiment of the present invention.

First, for example, $SiO_2$—$Yb_2O_3$—$GeO_2$ particle (soot) 302 is deposited on a substrate 301 of Si or $SiO_2$ by flame hydrolysis deposition (FHD) (FIG. 22A: step S101), after that, the temperature is further increased so that the soot 302 is subjected to transparent vitrification, and a transparent vitrified silica 303 is deposited on the substrate 301 (FIG. 22B: step S102). The thickness of the soot 302 deposited in step S101 is set to such a thickness that is 3 mm at a time point when the soot 302 is transparent vitrified. Moreover, when the soot 302 is deposited on the substrate 301, the distribution in the thickness direction, of the addition concentration of Yb after transparent vitrification is controlled such that the Yb addition concentration distribution illustrated in FIG. 2 is compressed to $\frac{1}{10000}$ in the longitudinal direction, and the distribution in the thickness direction of the addition concentration of Ge is controlled such that the Ge addition concentration distribution illustrated in FIG. 6 is compressed to $\frac{1}{10000}$ in the longitudinal direction. The element to be added is not limited to Yb and Ge, but Al may be added in a uniform concentration in the thickness direction in order to suppress photodarkening. Subsequently, the substrate 301 is removed by etching or the like (FIG. 22C:

step S103), and after that, a circular disk 304 having a diameter of 3.5 mm is cut from the transparent vitrified silica 303 after the substrate 301 is removed (FIG. 22D: step S104). This disk 304 is a portion serving as the core 2 after a subsequent wire drawing step is performed.

Figure 22E:
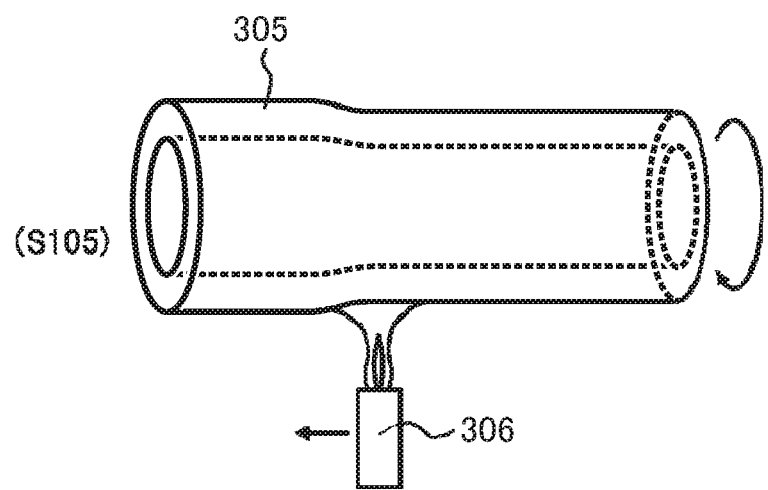
FIG. 22E is a schematic diagram of production steps for describing a production method for an optical fiber for a fiber laser according to the seventh embodiment of the present invention.

Subsequently, a hollow cylindrical silica glass tube 305 having an outer diameter of 60 mm and a thickness of approximately 11 mm, for example, is heated from the outer side thereof by the flame of an oxyhydrogen burner 306 while rotating the tube 305 so that the tube 305 is shaped an outer diameter of 35 mm and an inner diameter of a little larger than 3.5 mm (FIG. 22E: step S105). In order to control the inner diameter accurately, a highly heat-resistant rod having an outer diameter of 3.5 mm may be disposed at the center of the tube 305. This tube 305 is a portion serving as the first cladding 3 after a subsequent wire drawing step is performed.

Figure 22F:
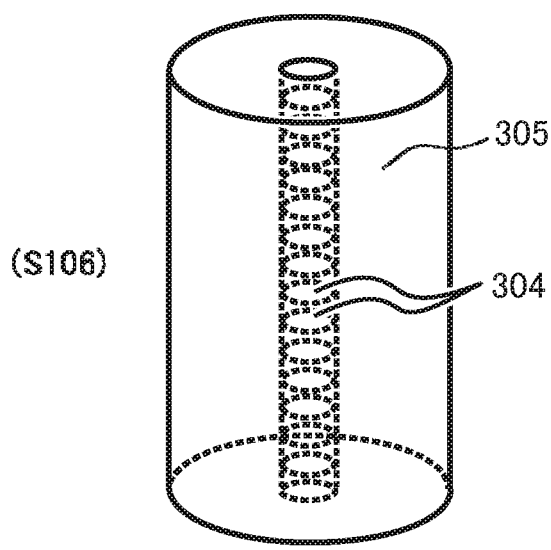
FIG. 22F is a schematic diagram of production steps for describing a production method for an optical fiber for a fiber laser according to the seventh embodiment of the present invention.
Figure 22G:
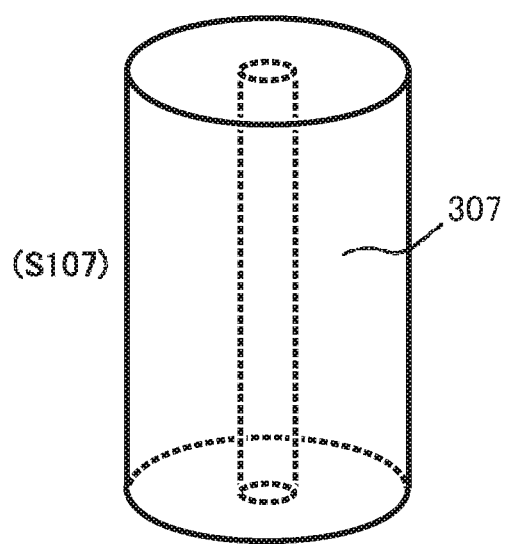
FIG. 22G is a schematic diagram of production steps for describing a production method for an optical fiber for a fiber laser according to the seventh embodiment of the present invention.

After the disk 304 and the shaped tube 305 are manufactured, a number of disks 304 serving as the core 2 is piled on the inner side of the shaped tube 305 (FIG. 22F: step S106). After that, in a state in which the central axis of the tube 305 is maintained vertically, the tube 305 is heated again by the flame of the oxyhydrogen burner from the outer side of the tube 305 while rotating the tube 305, which is not illustrated. In this way, the tube 305 and the disk 304 are fused and integrated together to manufacture a preform 307 of optical fiber (FIG. 22G: step S107).

The preform 307 manufactured in this manner is subjected to wire drawing in a fiberization step (wire drawing) to manufacture an optical fiber having an outer diameter of 350 μm. In this process, the second cladding 4 is formed on the outer side of the optical fiber using a UV-curable polymer or the like. As for the fiberization step (wire drawing), since a generally well-known method can be applied, the detailed description will be omitted.

When the optical fiber manufactured according to the above-described production method is cut every 30 meters, it is possible to obtain the optical fiber for a fiber laser 1 in which the second cladding diameter is 350 μm, the core diameter is 35 m, the addition concentration of Yb to the core 2 is controlled to be the Yb addition concentration distribution illustrated in FIG. 2, and the addition concentration of Ge to the core 2 is controlled to be the Ge addition concentration distribution illustrated in FIG. 6. When the effective length of the preform 307 in the state of step S107 in FIG. 22G is 600 mm, two hundred optical fibers for a fiber laser 1 having the length of 30 m can be produced from one preform 307.

In order to allow the cutting position of the optical fiber which is wire-drawn from the preform 307 to be easily visible, an element other than the above-mentioned element, capable of forming markers which can be identified with radiation of visible rays or ultraviolet rays from the outer side of the optical fiber may be added to at least one flat surface of the disk 304. Moreover, instead of adding an element serving as markers to the flat surface of the disk 304, a thin $SiO_2$ disk having an outer diameter of 3.5 mm to which an element capable of forming markers may be inserted between adjacent disks 304.

Eighth Embodiment

FIGS. 23A to 23D are schematic diagrams of production steps for describing a production method for the optical fiber for a fiber laser 1 according to the present invention. A production method of the present embodiment illustrates another example of a production method for producing the optical fiber for a fiber laser 1 in which the addition concentration of Yb to the core 2 and the addition concentration of a refractive index adjustment element are changed in the longitudinal direction as in the optical fiber for a fiber laser 1 of the first embodiment.

Figure 23A:
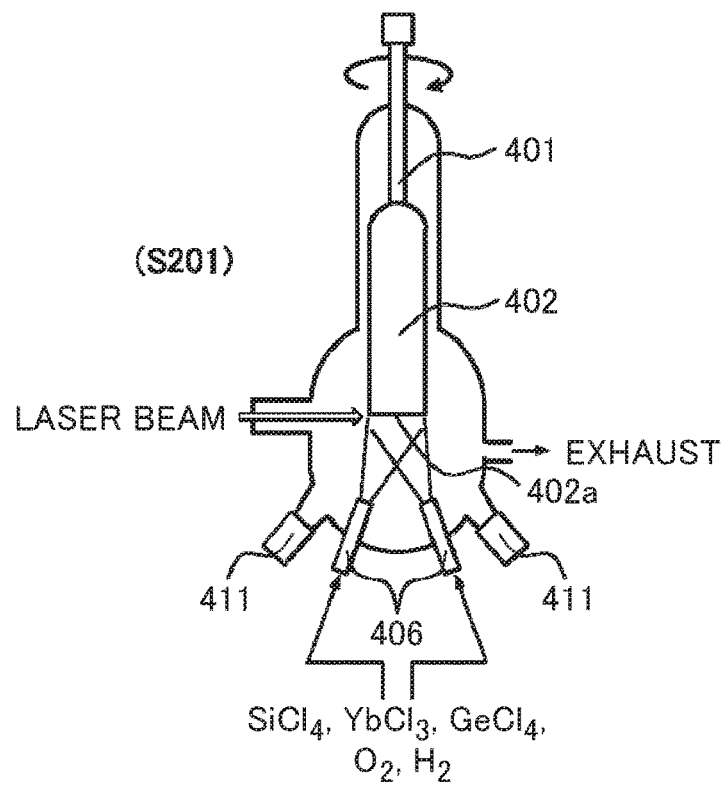
FIG. 23A is a schematic diagram of production steps for describing a production method for an optical fiber for a fiber laser according to an eighth embodiment of the present invention.
Figure 23B:
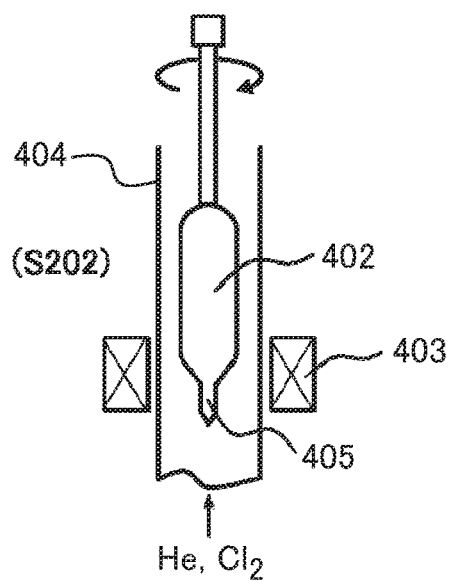
FIG. 23B is a schematic diagram of production steps for describing a production method for an optical fiber for a fiber laser according to the eighth embodiment of the present invention.

First, a porous base material (soot) is grown while changing the addition concentrations of Yb and Ge periodically in an axial direction of a glass seed rod 401 by a vapor phase axial deposition method (VAD) to obtain a soot body 402. In this case, the addition concentrations of Yb and Ge in the axial direction of the soot body 402 can be changed by changing mixture ratios of $YbCl_3$ and $GeCl_4$ in a gas blown from a burner 406 toward the soot body 402 (FIG. 23A: step S201). After that, the obtained soot body 402 is inserted into a high-temperature furnace 404 having a heat zone heated to approximately 1500° C. by a heater 403 to manufacture a transparent vitrified columnar rod 405 (FIG. 23B: step S202). This rod is a portion serving as the core 2 after a subsequent wire drawing step is performed.

Figure 23C:
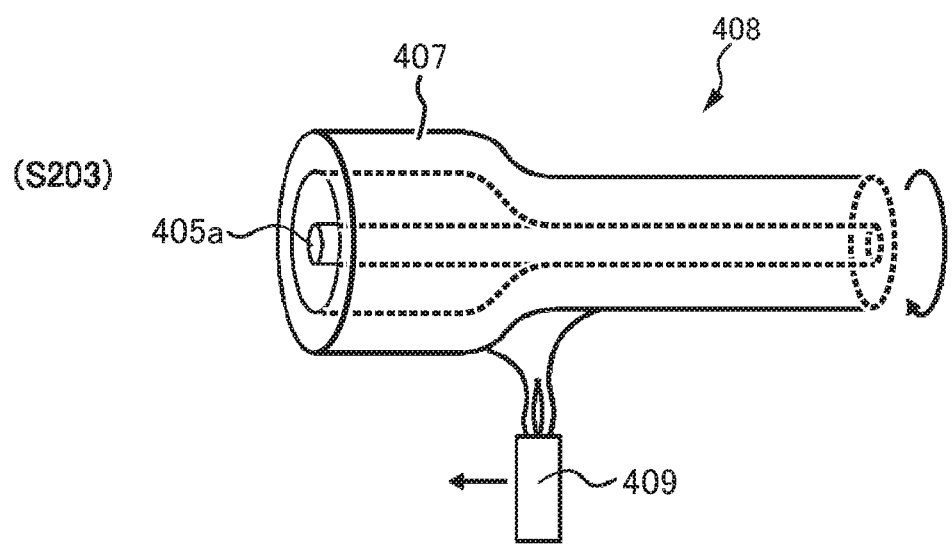
FIG. 23C is a schematic diagram of production steps for describing a production method for an optical fiber for a fiber laser according to the eighth embodiment of the present invention.
Figure 23D:
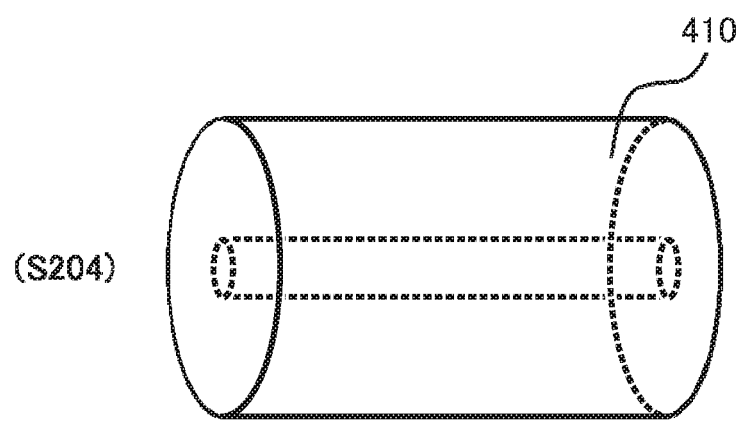
FIG. 23D is a schematic diagram of production steps for describing a production method for an optical fiber for a fiber laser according to the eighth embodiment of the present invention.

Subsequently, after the rod 405 manufactured in this manner is machined or shaped into a rod 405a having a small outer diameter of 3.5 mm, for example, by cutting or etching, the rod 405a is disposed at the center of a hollow cylindrical silica glass tube 407 having an outer diameter of 60 mm and a thickness of approximately 11 mm to form a rod-in-tube 408. After that, the rod-in-tube 408 collapses with the flame of an oxyhydrogen burner 409 (FIG. 23C: step S203). The tube 407 is a portion serving as the first cladding 3 after a subsequent wire drawing step is performed. When the rod-in-tube 408 collapses, the tube 407 and the rod 405a are fused and integrated together to manufacture a preform 410 of optical fiber (FIG. 23D: step S204).

The preform 407 manufactured in this manner is subjected to wire drawing in a fiberization step (wire drawing) to manufacture an optical fiber having an outer diameter of 350 μm similarly to the seventh embodiment. In this process, the second cladding 4 is formed on the outer side of the optical fiber using a UV-curable polymer or the like. In the process of step S204 in FIG. 23C, when the preform 410 is manufactured such that the effective length of the preform 410 is 600 mm and has an outer diameter of 35 mm, the diameter of a portion serving as the core 2 is 3.5 mm, and one period of the concentration distribution of Yb or Ge added to the portion serving as the core 2 is 3 mm corresponding to one sheet of the disk according to the seventh embodiment, two hundred optical fibers for a fiber laser having the length of 30 m can be manufactured from one preform 410 similarly to the seventh embodiment. In this production method, since the portion serving as the core 2 is manufactured from the rod 405, the step of piling up the disk 304 is not necessary unlike the seventh embodiment.

Since it is required that the concentration of Yb or Ge in the radial direction of the core 2 is uniform, it is preferable that a surface shape of the soot deposition surface 402a of the soot body 402 is a flat surface vertical to the central axis of the soot body 402. Therefore, as illustrated in step S201 of FIG. 23A, a plurality of burners 406 for depositing the soot body 402 according to the oxyhydrogen flame hydrolysis method including a silicon tetrachloride ($SiCl_4$) and a surface shape monitoring device 411 such as a stereoscopic imaging device for monitoring the surface shape of the soot deposition surface 402a may be further included. By providing the monitoring result obtained by the surface shape monitoring device 411 as a feedback, it is possible to deposit the soot body 402 while adjusting the heating power of the plurality of burners 406 so that the surface shape of the soot deposition surface 402a is a flat surface vertical to the central axis of the soot body 402. Moreover, a laser beam may scan along the soot deposition surface 402a. Soot deposited on the lower side of a laser scanning surface can be re-evaporated by a laser beam so that the surface shape of the soot deposition surface 402a can be maintained to a flat surface vertical to the central axis of the soot body 402.

Ninth Embodiment

Figure 24A:
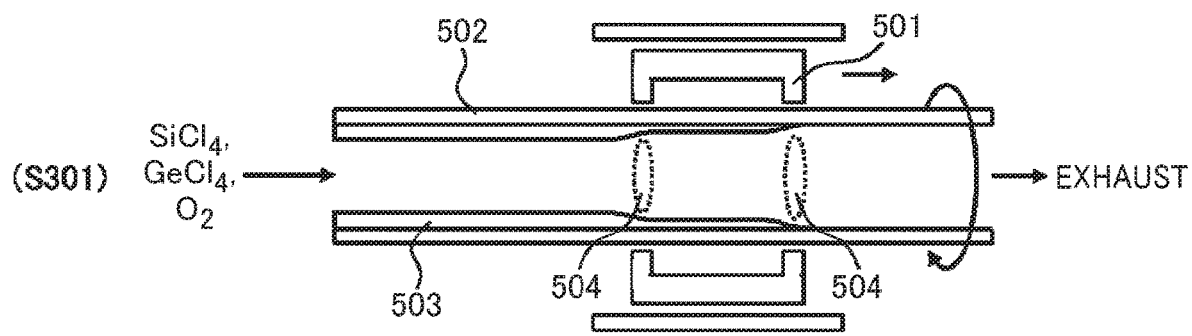
FIG. 24A is a schematic diagram of production steps for describing a production method for an optical fiber for a fiber laser according to a ninth embodiment of the present invention.
Figure 24B:
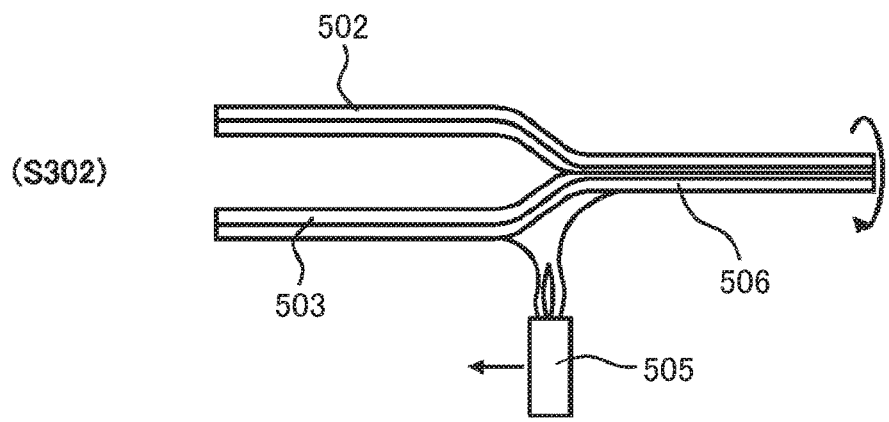
FIG. 24B is a schematic diagram of production steps for describing a production method for an optical fiber for a fiber laser according to the ninth embodiment of the present invention.
Figure 24C:
FIG. 24C is a schematic diagram of production steps for describing a production method for an optical fiber for a fiber laser according to the ninth embodiment of the present invention.

FIGS. 24A to 24C are schematic diagrams of production steps for describing a production method for an optical fiber for a fiber laser according to the present invention. A production method of the present embodiment illustrates still another example of a production method for producing the optical fiber for a fiber laser 1 in which the addition concentration of Yb to the core 2 and the addition concentration of a refractive index adjustment element are changed in the longitudinal direction as in the optical fiber for a fiber laser 1 of the first embodiment.

For example, a hollow cylindrical silica glass tube 502 having an inner diameter of 10 mm and a thickness of 2.4 mm is disposed in a high-frequency cavity 501, and silica glass is deposited on an inner wall of the tube 502 to a thickness of 31 μm by a plasma activated chemical vapor deposition method (PCVD) to form a transparent glass layer 503. The tube 502 is a portion serving as the first cladding 3 after a subsequent wire drawing step is performed, and the transparent glass layer 503 in the tube 502 is a portion serving as the core 2 after a subsequent wire drawing step is performed. In this case, raw gas is supplied while changing the concentrations of $YbCl_3$ and $GeCl_4$ according to the movement of the deposition position of silica glass by high-frequency induction thermal plasma 504 generated inside the tube 502, for example, at intervals at which the deposition position of silica glass moves every 30 mm in the longitudinal direction of the tube 502 (FIG. 24A: step S301). After that, the hollow portion of the tube 502 collapses with the flame of an oxyhydrogen burner 505 (FIG. 24B: step S302) to manufacture a preform 506 of optical fiber (FIG. 24C: step S303).

The preform 506 manufactured in this manner is subjected to wire drawing in a fiberization step (wire drawing) to be extended to a length of 1000 times the original length to manufacture an optical fiber having an outer diameter of 350 μm. With the fiberization step, the core diameter becomes 35 μm. In the fiberization step, the second cladding 4 is formed on the outer side of the optical fiber using a UV-curable polymer or the like.

In the plasma activated chemical vapor deposition, silica glass is deposited directly rather than soot. Therefore, when the high-frequency induction thermal plasma 504 is generated locally in the narrow high-frequency cavity 501, it is possible to form the transparent glass layer 503 formed of silica glass in which the addition concentrations of Yb and Ge are controlled in the longitudinal direction of the tube 502. In the present embodiment, it is possible to manufacture the optical fiber for a fiber laser 1 having a desired concentration distribution by controlling the addition concentration of Yb such that the Yb addition concentration distribution illustrated in FIG. 2 is compressed to $\frac{1}{1000}$ in the longitudinal direction and the addition concentration of Ge such that the Ge addition concentration distribution illustrated in FIG. 6 is compressed to $\frac{1}{1000}$ in the longitudinal direction. In the present embodiment, when the effective length of the preform 506 in the state of step S303 in FIG. 24C is 900 mm, thirty optical fibers for a fiber laser 1 having the length of 30 m can be manufactured from one preform 506.

Although the number of optical fibers for a fiber laser 1 manufactured from one preform 506 in the present embodiment is smaller than that of the production methods of the seventh and eighth embodiments, the present embodiment provides a merit that the addition concentration of a rare-earth element can be controlled in the radial direction of the core 2. When it is not necessary to control the addition concentration in the radial direction of the core 2, the production time may be shortened by providing a plurality of plasma generation cavities at the same intervals as the period (distance) of changing the addition concentration in the longitudinal direction of the tube 502.

Tenth Embodiment

Figure 25A:
FIG. 25A is a schematic diagram of production steps for describing a production method for an optical fiber for a fiber laser according to a tenth embodiment of the present invention.

FIGS. 25A to 25C are schematic diagrams of production steps for describing a production method for the optical fiber for a fiber laser according to the present invention. A production method of the present embodiment illustrates an example of a production method for producing the optical fiber for a fiber laser 1 in which the addition concentration of Yb to the core 2 and the addition concentration of a numerical aperture adjustment element added to the first cladding 3 are changed in the longitudinal direction as in the optical fiber for a fiber laser 1 of the second embodiment.

First, in the same step as step S201 in FIG. 23A and step S202 in FIG. 23B in the production method of the eighth embodiment, a porous base material (soot) is grown while changing the addition concentration of Yb periodically in an axial direction by a vapor phase axial deposition method (VAD) to obtain a soot body (step S401). After that, the obtained soot body is inserted into a high-temperature furnace having a heat zone heated to approximately 1500° C. by a heater to achieve transparent vitrification to manufacture a columnar rod formed of silica glass (step S402). This rod is a portion serving as the core 2 after a subsequent wire drawing step is performed. The diagrams of steps S401 and S402 are omitted since the diagrams are the same as those of steps S201 and S202 in FIGS. 23A and 23B. In the present embodiment, the addition concentration distribution of Yb in the central axis direction of the rod is controlled such that the Yb addition concentration distribution illustrated in FIG. 2 is compressed to $\frac{1}{10000}$ in distance.

Subsequently, after the manufactured rod is machined or shaped into a rod having an outer diameter of 3.5 mm, for example, by cutting or etching, the rod is heated with the flame of an oxyhydrogen burner to be extended to a length of approximately 10 times the original length to obtain a narrow rod 601 having an outer diameter of 1.1 mm (FIG. 25A: step S403). Silica glass is deposited on an outer surface of the rod 601 as a core base material by a plasma activated outside vapor deposition method (POVD) to form a silica glass layer 602. The silica glass layer 602 is a portion serving as the first cladding 3 after a subsequent wire drawing step is performed.

The silica glass layer 602 is formed while changing the concentration of a fluoride compound which is a numerical aperture adjustment element included in raw gas supplied to a plasma torch 603 so as to be identical to the Yb addition concentration distribution in the axial direction of the narrow rods 601 having a period of 30 mm included in the core base material, for example, by compressing the F addition concentration distribution illustrated in FIG. 5 to $\frac{1}{1000}$ in the longitudinal direction. The plasma torch 603 is moved to reciprocate over a region in which the silica glass layer 602 is formed during execution of the plasma activated outside vapor deposition (FIG. 25B: step S404). In this way, a preform 604 of optical fiber having an outer diameter of 11 mm is manufactured (FIG. 25C: step S405).

Subsequently, the preform 604 manufactured in this manner is subjected to wire drawing in a fiberization step (wire drawing) to be extended to a length of 1000 times the original length to manufacture an optical fiber having an outer diameter of 350 µm. With the fiberization step, the core diameter becomes 35 µm. In the fiberization step, the second cladding 4 is formed on the outer side of the optical fiber using a UV-curable polymer or the like. When the effective length of the preform 604 in the state of step S405 in FIG. 25C is 900 mm, thirty optical fibers for a fiber laser having the length of 30 m can be manufactured from one preform 604.

According to this production method, the first cladding 3 in which the addition concentration of a numerical aperture adjustment element capable of changing the refractive index according to the change in the addition concentration of a rare-earth element can be formed easily around the core 2 in which the addition concentration of a rare-earth element changes in the longitudinal direction of the optical fiber for a fiber laser 1.

EXPLANATION OF REFERENCE NUMERALS

1: Optical fiber for a fiber laser
2: Core
3: First cladding (Excitation cladding)
4: Second cladding
5, 105, 205: Fiber laser
6: Oscillator unit
7: Front excitation unit
8: Rear excitation unit
9: Laser diode module (LDM)
10: Tapered fiber bundle (TFB)
11: High reflector-fiber Bragg grating (HRFBG)
12: Output coupler-fiber Bragg grating (OCFBG)
13: Beam delivery unit
14: Delivery fiber
15: Laser beam
16: Cooling plate
17: Thermoconductive adhesive
18: Beam combiner
301: Substrate
302: Soot
303: Silica glass
304: Disk
305, 407, 502: Silica tube
306, 409, 505: Oxyhydrogen burner
307, 410, 506, 604: Preform
401: Glass seed rod
402: Soot body
402a: Soot deposition surface
403: Heater
404: High-temperature furnace
405, 405a, 601: Rod
406: Burner
408: Rod-in-tube
411: Surface shape monitoring device
501: High-frequency cavity
503, 602: Silica glass layer
504: High-frequency induction thermal plasma
603: Plasma torch

What is claimed is:

1. An optical fiber for a fiber laser including a core to which a rare-earth element is added, a first cladding formed around the core, and a second cladding formed around the first cladding, in which excitation light is guided from at least one end of the first cladding to excite the rare-earth element to output a laser oscillation light, wherein
    an addition concentration of the rare-earth element to the core is different in a longitudinal direction of the optical fiber for a fiber laser,
    a core diameter and a numerical aperture of the optical fiber for a fiber laser are constant in the longitudinal direction of the optical fiber for a fiber laser, and
    a numerical aperture adjustment element that changes a refractive index of the first cladding is added to the first cladding so that a numerical aperture of the optical fiber for a fiber laser is maintained to be constant in the longitudinal direction of the optical fiber for a fiber laser with respect to change in a numerical aperture of the optical fiber for a fiber laser occurring due to change in a refractive index of the core due to change in the addition concentration of the rare-earth element to the core.

2. The optical fiber for a fiber laser according to claim 1, wherein
    the addition concentration of the rare-earth element to the core in a region closer to the end that guides the excitation light in the longitudinal direction of the optical fiber for a fiber laser is lower than that in an other region.

3. A fiber laser comprising:
    the optical fiber for a fiber laser according to claim 1;
    a tapered fiber bundle connected to an end of the optical fiber for a fiber laser; and
    a plurality of light sources that emit excitation light to be guided to the first cladding of the optical fiber for a fiber laser via the tapered fiber bundle.

4. The fiber laser according to claim 3, wherein
    an addition concentration distribution of the rare-earth element is controlled in the longitudinal direction of the optical fiber for a fiber laser so that the temperature of the optical fiber for a fiber laser during rated optical output or maximum optical output is uniform in the longitudinal direction of the optical fiber for a fiber laser.

5. The fiber laser according to claim 3, wherein
    the fiber laser guides excitation light to the first cladding from one direction, and
    an addition concentration distribution of the rare-earth element is controlled in the longitudinal direction of the optical fiber for a fiber laser so that the temperature of the optical fiber for a fiber laser during rated optical output or maximum optical output is constant in a length portion of at least 50% and less than 100% from the end that guides the excitation light among the entire length of the optical fiber for a fiber laser and is lower than the constant temperature in a remaining length portion.

6. The fiber laser according to claim 3, wherein
    at least a portion of the optical fiber for a fiber laser is provided on an inner side of a groove formed in a cooling plate formed of a thermoconductive member, the groove being deeper than at least an outer diameter of the optical fiber for a fiber laser, with the aid of a thermoconductive adhesive or a thermoconductive paste.

7. The fiber laser according to claim 6, wherein
the optical fiber for a fiber laser has a portion in which fibers cross each other, and
the cooling plate is configured such that, in the portion in which the optical fibers for a fiber laser cross each other, a depth of the grooves in which one of the crossing optical fibers for a fiber laser are provided is different from a depth of the groove in which the other crossing optical fibers for a fiber laser are provided so that the crossing optical fibers for a fiber laser do not make contact with each other or such that a bridge formed of a thermoconductive member is provided to extend over the groove in which one of the crossing optical fibers for a fiber laser are provided and the other crossing optical fibers for a fiber laser are provided on the bridge.

8. A fiber laser comprising:
a plurality of the fiber lasers according to claim 3; and a beam combiner that combines laser outputs emitted from the plurality of fiber lasers to one optical fiber.

9. A production method for the optical fiber for a fiber laser according to claim 1, comprising:
allowing a soot to grow while changing the addition concentration of the rare-earth element periodically in an axial direction to manufacture a soot body by a vapor phase axial deposition method;
subjecting the soot body to silica vitrification to manufacture a rod; and
depositing silica glass serving as the first cladding to an outer surface of the rod serving as a core base material in the axial direction by a plasma activated outside vapor deposition method while changing a concentration of the numerical aperture adjustment element included in a raw gas so as to be identical to a period in the axial direction of the rod, of the change in the addition concentration of the rare-earth element included in the core base material to manufacture a preform; and
performing wire drawing while heating the preform.

* * * * *